US011041093B2

(12) United States Patent
Corten et al.

(10) Patent No.: US 11,041,093 B2
(45) Date of Patent: *Jun. 22, 2021

(54) AQUEOUS DISPERSIONS CONTAINING POLYMERIZATES PRODUCED IN MULTIPLE STAGES WITH POLYURETHANES AS WELL AS COATING AGENT COMPOSITIONS CONTAINING SAME

(71) Applicant: BASF Coatings GmbH, Münster (DE)

(72) Inventors: Cathrin Corten, Muenster (DE); Dirk Eierhoff, Muenster (DE); Wilma Nimz, Muenster (DE); Nicole Freitag, Muenster (DE); Heinz-Ulrich Grumpe, Muenster (DE); Mechthild Vienenkoetter, Muenster (DE)

(73) Assignee: BASF Coatings GmbH, Münster (DE)

( * ) Notice: Subject to any disclaimer, the term of this patent is extended or adjusted under 35 U.S.C. 154(b) by 187 days.

This patent is subject to a terminal disclaimer.

(21) Appl. No.: 16/318,902

(22) PCT Filed: Jul. 20, 2017

(86) PCT No.: PCT/EP2017/068348

§ 371 (c)(1),
(2) Date: Jan. 18, 2019

(87) PCT Pub. No.: WO2018/015491

PCT Pub. Date: Jan. 25, 2018

(65) Prior Publication Data

US 2019/0241765 A1 Aug. 8, 2019

(30) Foreign Application Priority Data

Jul. 20, 2016 (EP) ................................ EP16180449

(51) Int. Cl.

| | |
|---|---|
| ***C09D 187/00*** | (2006.01) |
| ***C09D 151/08*** | (2006.01) |
| ***C08G 18/76*** | (2006.01) |
| ***C08F 290/14*** | (2006.01) |
| ***C08F 265/06*** | (2006.01) |
| ***C08F 285/00*** | (2006.01) |
| ***C08G 18/34*** | (2006.01) |
| ***C08G 18/42*** | (2006.01) |
| ***C08F 290/06*** | (2006.01) |
| ***C08G 18/75*** | (2006.01) |
| ***B32B 27/40*** | (2006.01) |
| ***C09D 151/00*** | (2006.01) |
| ***B32B 27/30*** | (2006.01) |
| ***C08G 18/66*** | (2006.01) |
| ***B05D 7/00*** | (2006.01) |
| ***C08G 81/02*** | (2006.01) |
| ***C09D 5/33*** | (2006.01) |

(52) U.S. Cl.

CPC ......... *C09D 187/005* (2013.01); *B05D 7/532* (2013.01); *B32B 27/308* (2013.01); *B32B 27/40* (2013.01); *C08F 265/06* (2013.01); *C08F 285/00* (2013.01); *C08F 290/067* (2013.01); *C08F 290/147* (2013.01); *C08G 18/348* (2013.01); *C08G 18/4211* (2013.01); *C08G 18/4216* (2013.01); *C08G 18/4244* (2013.01); *C08G 18/4288* (2013.01); *C08G 18/6659* (2013.01); *C08G 18/755* (2013.01); *C08G 18/765* (2013.01); *C08G 81/024* (2013.01); *C09D 5/004* (2013.01); *C09D 151/003* (2013.01); *C09D 151/08* (2013.01)

(58) Field of Classification Search

None

See application file for complete search history.

(56) References Cited

U.S. PATENT DOCUMENTS

| | | | | |
|---|---|---|---|---|
| 2009/0068367 A1* | 3/2009 | Geurts | C09D 133/08 427/385.5 |
| 2015/0011703 A1* | 1/2015 | Roberts | C09D 175/00 524/591 |
| 2018/0265711 A1 | 9/2018 | Corten et al. | |
| 2019/0062588 A1 | 2/2019 | Corten et al. | |
| 2019/0085116 A1 | 3/2019 | Corten et al. | |

FOREIGN PATENT DOCUMENTS

| | | | | |
|---|---|---|---|---|
| DE | 4437535 A1 | 4/1996 | |
| DE | 19914896 A1 | 10/2000 | |
| DE | 19930665 A1 | 1/2001 | |
| DE | 19948004 A1 | 7/2001 | |
| DE | 10043405 C1 | 6/2002 | |
| DE | 102012215127 A1 | 2/2013 | |
| EP | 0228003 A1 | 7/1987 | |
| EP | 0634431 A1 | 1/1995 | |
| JP | 06179726 A * | 6/1994 | C08F 212/08 |
| WO | 9115528 A1 | 10/1991 | |
| WO | 9215405 A1 | 9/1992 | |

(Continued)

OTHER PUBLICATIONS

Machine Translation of JP-06179726-A (Year: 1994).*

(Continued)

*Primary Examiner* — Shamim Ahmed
*Assistant Examiner* — Bradford M Gates
(74) *Attorney, Agent, or Firm* — Armstrong Teasdale LLP

(57) ABSTRACT

Aqueous dispersions including multistage-prepared polymers of mixtures of olefinically unsaturated compounds are disclosed. The aqueous dispersions include at least one polyurethane containing olefinically unsaturated groups. Production and use of the aqueous dispersions, particularly in the field of automotive finishing, is disclosed. The disclosure further relates to an aqueous basecoat material including the multistage-prepared polymers, and also to a method for producing a multicoat paint system using the aqueous basecoat material.

15 Claims, No Drawings

(56) References Cited

FOREIGN PATENT DOCUMENTS

| | | | |
|---|---|---|---|
| WO | 0125307 | A1 | 4/2001 |
| WO | 2015007427 | A1 | 1/2015 |
| WO | 2018011311 | A1 | 1/2018 |
| WO | 2018015484 | A1 | 1/2018 |
| WO | 2018172475 | A1 | 9/2018 |
| WO | 2018172476 | A1 | 9/2018 |

OTHER PUBLICATIONS

English translation of International Search Report for International Application No. PCT/EP2017/068348, dated Oct. 12, 2017, 2 pages.

* cited by examiner

AQUEOUS DISPERSIONS CONTAINING POLYMERIZATES PRODUCED IN MULTIPLE STAGES WITH POLYURETHANES AS WELL AS COATING AGENT COMPOSITIONS CONTAINING SAME

CROSS-REFERENCE TO RELATED APPLICATIONS

This application is a U.S. National Phase Application of PCT/EP2017/068348, filed Jul. 20, 2017, which claims the benefit of priority to EP Application No. 16180449.7, filed Jul. 20, 2016, the contents of which are hereby expressly incorporated by reference in their entirety.

The present invention relates to aqueous dispersions comprising multistage-prepared polymers of mixtures of olefinically unsaturated compounds, comprising at least one polyurethane containing olefinically unsaturated groups, and also to their production and use, particularly in the field of automotive finishing. The present invention further relates to an aqueous basecoat material which comprises the multistage-prepared polymers.

PRIOR ART

Known in the prior art are polymers which can be used as binders for automotive finishing. Such a binder is required to meet a multiplicity of properties. For instance, it must be able to be used in modern multicoat paint systems of the kind used in the automobile industry.

The prior art (cf., e.g., German patent application DE 199 48 004 A1, page 17, line 37 to page 19, line 22, or German patent DE 100 43 405 C1, column 3, paragraph [0018], and column 8, paragraph [0052], to column 9, paragraph [0057], in conjunction with column 6, paragraph [0039], to column 8, paragraph [0050]) has disclosed the following process, in which (1) a pigmented aqueous basecoat material is applied to a substrate, (2) a polymer film is formed from the coating material applied in stage (1), (3) a clearcoat material is applied to the resulting basecoat film, and subsequently (4) the basecoat film is cured together with the clearcoat film to give a multicoat paint system.

This process is widely employed, for example, not only for the OEM (original) finishing of automobiles but also for the painting of metal and plastic components for installation in or on vehicles.

The resulting multicoat paint system is required to fulfill a multiplicity of properties.

Where coating defects occur, the vehicle bodies are coated a second time with the basecoat and clearcoat materials by the aforementioned process. Here, in the case of OEM automotive refinishing, the coating material used may be the same as for the first coating.

Also possible, however, is the use of a clearcoat material which cures not at high temperatures (about 140° C.) but instead at much lower temperatures (about 80° C.). The resultant paint system must conform to the exacting demands of the automotive industry for appearance and integrity; the adhesion between the refinish basecoat and the original finish may present particular difficulties.

One polymer which has been known in the prior art for many years, and which even now has high relevance as a binder in automotive OEM finishing, is a polyurethane known from WO 92/15405. This binder is used with the aim of improving the refinish adhesion, and can therefore serve as a reference for adhesion properties.

In the Korea Polymer Journal (Korea Polym. J., vol. 7, No. 4, pp. 213-222), Hong, Kim, Kim, and Park describe polymers of multistage construction for use as binders in metallic finishes. These polymers are produced via an operation wherein the first stage of the polymer is prepared via a batch operation and the second and third stages are each carried out as starved feed polymerizations.

Problem

The problem addressed by the present invention, then, was that of providing an aqueous dispersion of a polymer which can be used to produce coatings which solve the problems described above.

By this is meant an improved adhesion both for the painting of metallic and plastics substrates and also, in particular, for automotive refinishing, both for the case of OEM clearcoat materials with a baked temperature of generally about 140° C., and for the case of refinish clearcoats with a baking temperature of in general about 80° C. In the context of improving adhesion, the focus is on the improved adhesion between basecoat and original finish. It is this adhesion which is to be improved in particular for use in OEM automotive refinishing.

Aqueous dispersions comprising a multistage polymer are usually prepared using emulsifiers. The latter bear part of the responsibility for adhesion problems found, since the emulsifiers used consist customarily of low molecular weight compounds and may therefore diffuse to the interfaces when employed in aqueous coating compositions.

The adhesion difficulties are especially striking when the coated substrates are exposed to weathering. The problem addressed by the present invention is therefore also that of providing polymers for coatings which, even after they have been exposed to weathering, still possess outstanding adhesion properties.

After weathering, there are often problems which arise, especially blistering and swelling. Another problem addressed by the present invention, then, was that of preventing or reducing the incidence of blisters and swelling.

Besides the adhesion improvements described, the present invention addressed the problem of providing polymers which, when used in coating compositions, exhibit improved properties in terms of storage stability of the coating compositions by comparison with the prior art.

Another problem addressed by the present invention was that of providing a polymer which, when used in coating compositions, meets the requirements of automotive OEM finishing in terms of attainable flop in the case of effect finishes, in terms of adequately high solids content for obtaining sufficiently high film thicknesses, and also in terms of a viscosity which allows them to be processed via electrostatic and/or pneumatic application.

Solution to the Problem

It has emerged that the problems described above are solved by an aqueous dispersion comprising a polymer SCS, prepared by the successive radical emulsion polymerization of three mutually different monomer mixtures (A), (B), and (C) of olefinically unsaturated monomers, wherein at least one of the monomer mixtures (A), (B) or (C) comprises at least one polyurethane (P) containing at least one olefinically unsaturated group, where, before the polyurethane (P) is admixed to at least one of the monomer mixtures (A), (B), and (C), the monomer mixture (A) comprises at least 50 wt % of monomers having a solubility in water of less than 0.5 g/l at 25° C., and a polymer (a) prepared from the mixture (A) possesses a glass transition temperature of 10 to 65° C., the monomer mixture (B) comprises at least one polyunsaturated monomer, and a polymer (b) prepared from the mixture (B) possesses a glass transition temperature of −35 to 15° C., a polymer (c) which is prepared from the monomer mixture (C) possesses a glass transition temperature of −50 to 15° C., and where i. first of all the monomer mixture (A) is polymerized, ii. then the monomer mixture (B) is polymerized in the presence of the polymer prepared under i., and iii. thereafter the monomer mixture (C) is polymerized in the presence of the polymer prepared under ii., and the polyurethane (P) has a surface tension in the range from 40 mN/m to 55 mN/m at 23° C., and possesses a polydispersity d of less than 10.

The new aqueous dispersion comprising at least one polymer SCS prepared as described above will also be referred to below as aqueous dispersion of the invention. Preferred embodiments of the aqueous dispersion of the invention are apparent from the description hereinafter and also from the dependent claims.

The above-described polymer SCS is what is called a seed-core-shell polymer.

Likewise a subject of the present invention is a pigmented aqueous basecoat material comprising the aqueous dispersion of the invention as binder, and the use of the aqueous dispersion of the invention for producing pigmented aqueous basecoat materials. The present invention relates not least to a method for producing a multicoat paint system on a substrate, and also to a multicoat paint system produced by said method.

DETAILED DESCRIPTION

To start with, a number of terms used in the context of the present invention will be elucidated.

The term "comprising" in the sense of the present invention, in connection with the aqueous dispersion of the invention, in one preferred embodiment has the meaning of "consisting of". All components, in each case in their preferred embodiments identified below, may be comprised in the aqueous basecoat material of the invention.

The measurement methods to be employed for the purposes of the present invention in order to determine particular variables can be found in the Examples section. Unless explicitly indicated otherwise, these are the measurement methods to be used to determine the variable in question.

The term "binder" is understood in the sense of the present invention in agreement with DIN EN ISO 4618 (German version, date: March 2007) preferably to refer to the nonvolatile reactions responsible for film formation, excluding pigments and fillers. The nonvolatile fraction can be determined in accordance with DIN EN ISO 3251 (date: Jun. 1, 2008). More particularly, the term "binder" refers to the resins, especially polymeric resins, which are present in the respective coating materials and are responsible for film formation. The term "binder" preferably also includes any crosslinking agents present in the coating material in question.

In reference to the aqueous dispersions, "aqueous" means a dispersion which includes a significant fraction of water. "Aqueous" in this context is to be understood preferably for the purposes of the present invention to mean that the dispersion has a fraction of water of at least 40 wt %, preferably at least 50 wt %, very preferably at least 60 wt %, based in each case on the total amount of the solvents (that is, water and organic solvents) present. With particular preference the fraction of water is 40 to 99 wt %, more particularly 50 to 98 wt %, very preferably 60 to 95 wt %, based in each case on the total amount of the solvents present.

The basecoat material of the invention is aqueous. The expression "aqueous" is familiar to the skilled person in connection with the basecoats. Basically it means a basecoat material that is not based exclusively on organic solvents, in other words does not contain exclusively organic-based solvents as its solvents, but instead, in contrast, includes a significant fraction of water as solvent. In the context of the present invention, in relation to coating compositions, "aqueous" should preferably be understood to mean that the coating composition in question, especially the basecoat material, has a fraction of at least 40 wt % of water, preferably at least 50 wt %, very preferably at least 60 wt %, based in each case on the total amount of the solvents present (that is, water and organic solvents). In turn, preferably, the fraction of water is 40 to 90 wt %, more particularly 50 to 80 wt %, very preferably 60 to 75 wt %, based in each case on the total amount of the solvents present.

The term "(meth)acrylate" is intended below to refer both to acrylate and to methacrylate.

The solids content by definition is the nonvolatile fraction of a composition. The nonvolatile fraction is determined according to DIN EN ISO 3251 (date: June 2008). Specific parameters within the aforementioned standard in relation to the aqueous dispersion and to the aqueous basecoat material are evident from the experimental section.

For standards, DIN standards for example, for which no version is stated or no year of issue is explicitly stated, the relevant version is that valid on the filing date or, if no valid version is in existence on the filing date, the most recent valid version of the standard.

The Aqueous Dispersion

An aqueous dispersion of the invention comprises at least one polymer SCS. A dispersion preferably comprises precisely one such polymer. The preparation of the polymer comprises the successive radical emulsion polymerization of three mutually different mixtures (A), (B), and (C) of olefinically unsaturated monomers, with at least one of the monomer mixtures, (A), (B) or (C), comprising at least one polyurethane (P) which contains at least one olefinically unsaturated group, possesses a surface tension in the range from 40 mN/m to 55 mN/m at 23° C., and has a polydispersity d of less than 10.

The preparation of the multistage polymer SCS is a multistage radical emulsion polymerization in which i. first of all the mixture (A) is polymerized, then ii. the mixture (B) is polymerized in the presence of the polymer prepared under i., and, further, iii. the mixture (C) is polymerized in the presence of the polymer prepared under ii. All three monomer mixtures are therefore polymerized via a separately conducted radical emulsion polymerization for each (that is, a stage or a polymerization stage), with these stages taking place in succession. In terms of time, the stages may immediately follow one another. It is also possible for the reaction solution in question, after the end of one stage, to be stored for a certain time and/or transferred to a different reaction vessel, and only then for the next stage to take place. The preparation of the specific multistage polymer preferably comprises no other polymerization steps besides the polymerization of the monomer mixtures (A), (B), and (C).

The concept of radical emulsion polymerization is known to the skilled person and is also elucidated in more detail again hereinafter.

In a polymerization of this kind, olefinically unsaturated monomers are polymerized in an aqueous medium, using at least one water-soluble initiator and in the presence of at least one emulsifier.

Corresponding water-soluble initiators are likewise known. The at least one water-soluble initiator is preferably selected from the group consisting of potassium, sodium, or ammonium peroxodisulfate, hydrogen peroxide, tert-butyl hydroperoxide, 2,2'-azo-bis(2-amidoisopropane) dihydrochloride, 2,2'-azobis-(N,N'-dimethyleneisobutyramidine) dihydrochloride, 2,2'-azobis(4-cyanopentanoic acid), and mixtures of the aforementioned initiators, such as hydrogen peroxide and sodium persulfate, for example. Likewise members of the stated preferred group are the redox initiator systems that are known per se.

By redox initiator systems are meant in particular those initiators which comprise at least one peroxide-containing compound in combination with at least one redox coinitiator, examples being reductive sulfur compounds such as, for example, bisulfites, sulfites, thiosulfates, dithionites or tetrathionates of alkali metals and ammonium compounds, sodium hydroxy-methanesulfinate dihydrate and/or thiourea. Accordingly it is possible to use combinations of peroxodisulfates with alkali metal or ammonium hydrogensulfites, examples being ammonium peroxodisulfate and ammonium disulfite. The weight ratio of peroxide-containing compounds to the redox coinitiators is preferably 50:1 to 0.05:1.

In combination with the initiators it is possible additionally to use transition metal catalysts, such as salts of iron, nickel, cobalt, manganese, copper, vanadium, or chromium, for example, such as iron(II) sulfate, cobalt(II) chloride, nickel(II) sulfate, copper(I) chloride, manganese(II) acetate, vanadium(III) acetate, manganese(II) chloride. Based on the total mass of the olefinically unsaturated monomers used in a polymerization, these transition metal salts are employed customarily in amounts of 0.1 to 1000 ppm. Hence it is possible to use combinations of hydrogen peroxide with iron(II) salts, such as, for example, 0.5 to 30 wt % of hydrogen peroxide and 0.1 to 500 ppm of Mohr's salt, in which case the fractional ranges are based in each case on the total weight of the monomers used in the respective polymerization stage.

The initiators are used preferably in an amount of 0.05 to 20 wt %, preferably 0.05 to 10, more preferably from 0.1 to 5 wt %, based on the total weight of the monomers used in the respective polymerization stage.

An emulsion polymerization takes place within a reaction medium that comprises water as continuous medium and comprises the at least one emulsifier in the form of micelles. The polymerization is initiated by decomposition of the water-soluble initiator in the water. The growing polymer chain enters the emulsifier micelles, and the further polymerization then takes place in the micelles. In addition to the monomers, the at least one water-soluble initiator, and the at least one emulsifier, the reaction mixture therefore consists primarily of water. The stated components, namely monomers, water-soluble initiator, emulsifier, and water, preferably account for at least 95 wt % of the reaction mixture. The reaction mixture preferably consists of these components.

The at least one emulsifier is used preferably in an amount of 0.1-10 wt %, more preferably 0.1-5 wt %, very preferably 0.1-3 wt %, based in each case on the total weight of the monomers used in the respective polymerization stage.

Emulsifiers as well are known in principle. Use may be made of nonionic or ionic emulsifiers, including zwitterionic emulsifiers, and also, optionally, mixtures of the aforementioned emulsifiers.

Preferred emulsifiers are possibly optionally ethoxylated and/or propoxylated alkanols having 10 to carbon atoms. They may have different degrees of ethoxylation and/or propoxylation (for example, adducts modified with poly(oxy)ethylene and/or poly(oxy)propylene chains consisting of 5 to 50 molecule units). Also possible for use are sulfated, sulfonated, or phosphated derivatives of the stated products. Such derivatives are generally employed in neutralized form.

Particularly preferred emulsifiers suitable are neutralized dialkylsulfosuccinic esters or alkyldiphenyl oxide disulfonates, available commercially for example as EF-800 from Cytec.

The emulsion polymerizations are carried out usefully at a temperature of 0 to 160° C., preferably of 15 to 95° C., more preferably of 60 to 95° C.

It is preferred here to operate in the absence of oxygen, and preferably under an inert gas atmosphere. The polymerization is generally carried out under atmospheric pressure, although the application of lower pressures or higher pressures is also possible. Particularly if polymerization temperatures are employed which lie above the boiling point under atmospheric pressure of water, of the monomers used and/or of the organic solvents, it is usual to select higher pressures.

The individual polymerization stages in the preparation of the multistage polymer may be carried out, for example, as what are called "starved feed" polymerizations (also known as "starve feed" or "starve fed" polymerizations).

A starved feed polymerization in the sense of the present invention is an emulsion polymerization in which the amount of free olefinically unsaturated monomers in the reaction solution (also called reaction mixture) is minimized throughout the reaction time. This means that the metered addition of the olefinically unsaturated monomers is such that over the entire reaction time a fraction of free monomers in the reaction solution does not exceed 6.0 wt %, preferably 5.0 wt %, more preferably 4.0 wt %, particularly advantageously 3.5 wt %, based in each case on the total amount of the monomers used in the respective polymerization stage. Further preferred within these strictures are concentration ranges for the olefinically unsaturated monomers of 0.01 to 6.0 wt %, preferably 0.02 to 5.0 wt %, more preferably 0.03 to 4.0 wt %, more particularly 0.05 to 3.5 wt %. For example, the highest weight fraction detectable during the reaction may be 0.5 wt %, 1.0 wt %, 1.5 wt %, 2.0 wt %, 2.5 wt %, or 3.0 wt %, while all other values detected then lie below the values indicated here. The total amount (also called total weight) of the monomers used in the respective polymerization stage evidently corresponds for stage i. to the total amount of the monomer mixture (A), for stage ii. to the total amount of the monomer mixture (B), and for stage iii. to the total amount of the monomer mixture (C).

The concentration of the monomers in the reaction solution here may be determined by gas chromatography, for example. In that case a sample of the reaction solution is cooled with liquid nitrogen immediately after sampling, and 4-methoxyphenol is added as an inhibitor. In the next step, the sample is dissolved in tetrahydrofuran and then n-pentane is added in order to precipitate the polymer formed at the time of sampling. The liquid phase (supernatant) is then analyzed by gas chromatography, using a polar column and an apolar column for determining the monomers, and a flame ionization detector. Typical parameters for the gas-chromatographic determination are as follows: 25 m silica capillary column with 5% phenyl-, 1% vinyl-methylpolysiloxane phase, or 30 m silica capillary column with 50% phenyl-, 50% methyl-polysiloxane phase, carrier gas hydrogen, split injector 150° C., oven temperature 50 to 180° C., flame ionization detector, detector temperature 275° C., internal standard isobutyl acrylate. The measurement is usually carried out only with the aforementioned variant. The selection thereof ought not to have an effect on the result of measurement. In just a few cases, however, there may be a superimposition of signals, removing the possibility of quantitative evaluation. In that case, the measurement is repeated with the variant which has so far not been used. The concentration of the monomers is determined, for the purposes of the present invention, preferably by gas chromatography, more particularly in compliance with the parameters specified above.

The fraction of the free monomers can be controlled in various ways.

One possibility for keeping the fraction of the free monomers low is to select a very low metering rate for the mixture of the olefinically unsaturated monomers into the actual reaction solution, wherein the monomers make contact with the initiator. If the metering rate is so low that all of the monomers are able to react virtually immediately when they are in the reaction solution, it is possible to ensure that the fraction of the free monomers is minimized.

In addition to the metering rate it is important that there are always sufficient radicals present in the reaction solution to allow each of the added monomers to react extremely quickly. In this way, further chain growth of the polymer is guaranteed and the fraction of free monomer is kept low.

For this purpose, the reaction conditions are preferably selected such that the initiator feed is commenced even before the start of the metering of the olefinically unsaturated monomers. The metering is preferably commenced at least 5 minutes beforehand, more preferably at least 10 minutes before. With preference at least 10 wt % of the initiator, more preferably at least 20 wt %, very preferably at least 30 wt % of the initiator, based in each case on the total amount of initiator, is added before the metering of the olefinically unsaturated monomers is commenced.

Preference is given to selecting a temperature which allows constant decomposition of the initiator.

The amount of initiator is likewise an important factor for the sufficient presence of radicals in the reaction solution. The amount of initiator should be selected such that at any given time there are sufficient radicals available, allowing the added monomers to react. If the amount of initiator is increased, it is also possible to react greater amounts of monomers at the same time.

A further factor determining the reaction rate is the reactivity of the monomers.

Control over the fraction of the free monomers can therefore be guided by the interplay of initiator quantity, rate of initiator addition, rate of monomer addition, and through the selection of the monomers. Not only a slowing-down of metering but also an increase in the initiator quantity, and also the premature commencement of addition of the initiator, serve the aim of keeping the concentration of free monomers below the limits stated above.

At any point during the reaction, the concentration of the free monomers can be determined by gas chromatography, as described above.

Should this analysis find a concentration of free monomers that comes close to the limiting value for the starved feed polymerization, as a result, for example, of small fractions of highly reactive olefinically unsaturated monomers, the parameters referred to above can be utilized in order to control the reaction. In this case, for example, the metering rate of the monomers can be reduced, or the amount of initiator can be increased.

For the purposes of the present invention it is preferable for the polymerization stages ii. and iii. to be carried out under starved feed conditions. This has the advantage that the formation of new particle nuclei within these two polymerization stages is effectively minimized. Instead, the particles existing after stage i. (and therefore also called seed below) can be grown further in stage ii. by the polymerization of the monomer mixture B (therefore also called core below). It is likewise possible for the particles existing after stage ii. (also below called polymer comprising seed and core) to be grown further in stage iii. through the polymerization of the monomer mixture C (therefore also called shell below), resulting ultimately in a polymer comprising particles containing seed, core, and shell.

Stage i. as well can of course also be carried out under starved feed conditions.

It is essential to the invention that at least one of the monomer mixtures (A), (B), and (C) in the successive radical emulsion polymerization for producing the aqueous dispersion comprising the polymer SCS comprises at least one polyurethane (P) containing at least one olefinically unsaturated group, the polyurethane (P) having a surface tension in the range from 40 mN/m to 55 mN/m at 23° C. and possessing a polydispersity d of less than 10. The surface tension is determined preferably by means of the ring method as in DIN EN 14210:2004-03, with the surface tension measurements being corrected as in DIN EN 14370:2014-11. The surface tension measurement takes place at a temperature of 23° C.

Addressed first of all below are polyurethanes (P) which in principle can be used for the purposes of this invention. Embodiments specifically preferred are described thereafter.

The at least one polyurethane (P) containing at least one olefinically unsaturated group has a surface tension in the range from 40 mN/m to 55 mN/m at 23° C. It is further preferred for the polyurethane to possess a surface tension in the range from 40.05 mN/m to 50 mN/m at 23° C. The concept of the surface tension is familiar to the skilled person and denotes a property existing between the surface (interface) between a liquid and a gas, such as the air, for instance.

It is further essential for the invention that the at least one polyurethane (P) containing at least one olefinically unsaturated group has a polydispersity d of less than 10. It is further preferred for the polyurethane (P) to have a polydispersity in the range from 2 to 7, more preferably in the range from 3 to 6.

The concept of polydispersity is familiar to the skilled person. This term describes the breadth of a molecular weight distribution and is calculated by the ratio of the weight-average molecular weight $M_w$ to the number-average molecular weight $M_n$. This definition automatically produces a lower limit for the value of d, which by definition lies at a value of greater than 1. At a value of 1, the polymer is monodisperse. Determining the weight-average and number-average molecular weights is done by gel permeation chromatography (GPC) in accordance with DIN55672-1 (March 2016).

The polyurethane (P) has at least one olefinically unsaturated group. The at least one olefinically unsaturated group ensures that the polyurethane (P), when admixed accordingly to at least one of the monomer mixtures (A), (B) or (C) in the emulsion polymerization, is copolymerized into the seed or the core or the shell, respectively.

The polyurethane (P) is preferably free from NCO groups. In the sense of this invention this means that the amount of NCO groups is less than 0.01 wt %.

The polyurethane (P) preferably has precisely one olefinically unsaturated group. It is possible, though, for minor secondary reactions to occur in the reaction regime for the synthesis of the polyurethane (P), and to result in the polyurethane (P) having more than one olefinically unsaturated group. It is therefore preferred to use polyurethanes (P) which to an extent of at least 90 wt %, preferably at least 95 wt %, very preferably at least 98 wt % have precisely one olefinically unsaturated group.

The polyurethane (P) is prepared preferably by reaction with at least one polyester diol and at least one polyisocyanate, followed by a chain extension reaction with at least one compound containing at least one olefinically unsaturated group and having at least one functional group that is reactive toward isocyanate groups.

The at least one polyester diol preferably used is prepared preferably by an esterification reaction of at least one polycarboxylic acid and/or esters or anhydrides thereof with at least one polyol. The preparation of the polyester diol has no peculiarities. The esterification takes place usually with the aid of a water separator.

For the synthesis of the polyester diol, preference is given to using at least a small molar excess of the polyol over the polycarboxylic acid. In this context it is particularly preferred for the ratio of the carboxylic acid groups of the polycarboxylic acid to the alcohol groups of the polyol to be 1:1.05 to 1:2. More preferably the ratio is 1:1.1 to 1:2.

The polycarboxylic acid is preferably an aliphatically saturated or aromatic carboxylic acid which is in turn preferably a dicarboxylic acid. Examples of suitable aliphatically saturated dicarboxylic acids are ethanedioic acid (oxalic acid), propanedioic acid (malonic acid), butanedioic acid (succinic acid), pentanedioic acid (glutaric acid), hexanedioic acid (adipic acid), heptanedioic acid (pimelic acid), octanedioic acid (suberic acid), nonanedioic acid (azelaic acid), decanedioic acid (sebacic acid), maleic acid, and hexahydrophthalic acid.

Examples of suitable aromatic dicarboxylic acids are 1,2-benzenedicarboxylic acid (phthalic acid), 1,3-benzenedicarboxylic acid (isophthalic acid), and 1,4-benzenedicarboxylic acid (terephthalic acid). The corresponding anhydrides, where they exist, can also be used.

A further possibility is to use dimer fatty acids as polycarboxylic acid. Dimer fatty acids (long also known as dimerized fatty acids or dimer acids) is the term used generally, and especially in the context of the present invention, for mixtures prepared by oligomerization of unsaturated fatty acids. They are for example preparable by catalytic dimerization of unsaturated vegetable fatty acids, with starting materials used being, in particular, unsaturated $C_{12}$ to $C_{22}$ fatty acids. Linkage proceeds principally according to the Diels-Alder type and results, depending on the number and position of the double bonds in the fatty acids used for preparing the dimer fatty acids, in mixtures of primarily dimeric products which, between the carboxyl groups, have cycloaliphatic, linear aliphatic, branched aliphatic, and also $C_6$-aromatic hydrocarbon groups. Depending on mechanism and/or any subsequent hydrogenation, the aliphatic radicals may be saturated or unsaturated and the fraction of aromatic groups as well may vary. The radicals between the carboxylic acid groups in that case contain, for example, 24 to 44 carbon atoms. Fatty acids with 18 carbon atoms are preferred for use in preparation, meaning that the dimeric product has 36 carbon atoms. The radicals which connect the carboxyl groups of the dimer fatty acids preferably have no unsaturated bonds and no aromatic hydrocarbon radicals. In the sense of the present invention, therefore, $C_{18}$ fatty acids are used preferably in the preparation of the dimer fatty acids. Particularly preferred for use are linoleic, linolic and/or oleic acid.

Depending on the reaction regime, the above-designated oligomerization produces mixtures which primarily comprise dimeric, but also trimeric, molecules and also monomeric molecules and other byproducts. Distillative purification is standard procedure. Commercial dimer fatty acids generally contain at least 80 wt % of dimeric molecules, up to 19 wt % of trimeric molecules, and not more than 1 wt % of monomeric molecule and other byproducts. Preference is given to using dimer fatty acids which consist to an extent of at least 90 wt %, preferably at least 95 wt %, very preferably at least 98 wt % of dimeric fatty acid molecules.

For the purposes of the present invention it is preferred to use dimer fatty acids which consist to an extent of at least 90 wt % of dimeric molecules, less than 5 wt % of trimeric molecules, and less than 5 wt % of monomeric molecules and other byproducts. Particularly preferred is the use of dimer fatty acids which consist to an extent of 95 to 98 wt % of dimeric molecules, less than 5 wt % of trimeric molecules, and less than 1 wt % of monomeric molecules and other byproducts. Likewise particularly preferred for use are dimer fatty acids which consist to an extent of at least 98 wt % of dimeric molecules, less than 1.5 wt % of trimeric molecules, and less than 0.5 wt % of monomeric molecules and other byproducts. Determining the fractions of monomeric, dimeric, and trimeric molecules and also of other byproducts in the dimer fatty acids may be done for example by gas chromatography (GC). In that case, prior to the GC analysis, the dimer fatty acids are converted via the boron trifluoride method into the corresponding methyl esters (see DIN EN ISO 5509) and then analyzed by GC.

A fundamental characteristic of "dimer fatty acids" for the purposes of the present invention, then, is that their preparation involves the oligomerization of unsaturated fatty acids. This oligomerization results primarily—that is preferably to an extent of at least 80 wt %, more preferably at least 90 wt %, very preferably at least 95 wt %, and more particularly at least 98 wt %—in dimeric products. The fact that the oligomerization predominantly produces dimeric products which therefore contain precisely two fatty acid molecules justifies this nomenclature, which is usual in any case.

Dimer fatty acids in use can be obtained as commercial products. Examples include Radiacid 0970, Radiacid 0971, Radiacid 0972, Radiacid 0975, Radiacid 0976, and Radiacid 0977 from Oleon, Pripol 1006, Pripol 1009, Pripol 1012, and Pripol 1013 from Croda, Empol 1008, Empol 1061, and Empol 1062 from BASF SE, and Unidyme 10 and Unidyme TI from Arizona Chemical.

Different polyols can be employed in the esterification reaction for preparing the preferred polyester diol. Especially preferred in this context is the use of diols, with further preference being given to the use of aliphatic diols having a molecular weight of 62 to 500 g/mol.

The diols may be cycloaliphatic, but preferably acyclic aliphatic, compounds which carry 2 hydroxyl groups as substituents.

Examples of suitable diols are ethylene glycol, neopentyl glycol, 1,2-propanediol, 2,2-dimethyl-1,3-propanediol, 1,4-butanediol, 1,3-butanediol, 1,5-pentanediol, 2,2,4-trimethyl-1,3-pentanediol, 1,6-hexanediol, 1,4-cyclohexanedimethanol and 1,2-cyclohexanedimethanol.

Further contemplated as polyols are polyethers of the general structural formula

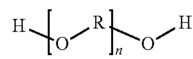

where R is a $C_3$ to $C_6$ alkyl radical. The index n is to be selected in each case such that said polyether possesses a number-average molecular weight of 450 to 2200 g/mol. More preferably it possesses a number-average molecular weight of 700 to 1400 g/mol and very preferably of 800 to 1200 g/mol.

In the polyether for use, all n radicals R may be the same. It is equally possible, however, for there to be different kinds of radicals R present. Preferably all of the radicals R are the same.

R is preferably a $C_3$ or a $C_4$ alkylene radical. More preferably it is an isopropylene or a tetramethylene radical.

Very preferably the polyether for use in accordance with the invention is polypropylene glycol or polytetrahydrofuran.

For further reaction of the polyester diol obtained by esterification reaction, all of the customary and known polyisocyanates used in the coatings field are contemplated in principle.

Examples of suitable polyisocyanates are isophorone diisocyanate (=5-isocyanato-1-isocyanatomethyl-1,3,3-trimethylcyclohexane), 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-(4-isocyanatobut-1-yl)-1,3,3-trimethyl-cyclohexane, 1-isocyanato-2-(3-isocyanatoprop-1-yl)cyclohexane, 1-isocyanato-2-(3-isocyanatoeth-1-yl)cyclohexane, 1-isocyanato-2-(4-isocyanatobut-1-yl)cyclohexane, 1,2-diisocyanatocyclobutane, 1,3-diisocyanatocyclobutane, 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, dicyclohexylmethane 2,4'-diisocyanate, dicyclohexylmethane 4,4'-diisocyanate, trimethylene diisocyanate, tetramethylene diisocyanate, pentamethylene diisocyanate, hexamethylene diisocyanate, ethylethylene diisocyanate, trimethylhexane diisocyanate, heptamethylene diisocyanate, or diisocyanates derived from dimer fatty acids, as sold under the trade name DDI 1410 by Henkel and described in patent WO 97/49745 and WO 97/49747, especially 2-heptyl-3,4-bis(9-isocyanatononyl)-1-pentylcyclohexane, 1,2-, 1,4- or 1,3-bis(isocyanatomethyl)cyclohexane, 1,2-, 1,4- or 1,3-bis(2-isocyanatoeth-1-yl)cyclohexane, 1,3-bis(3-isocyanatoprop-1-yl)cyclohexane or 1,2-, 1,4- or 1,3-bis(4-isocyanatobut-1-yl)cyclohexane, m-tetra-methylxylylene diisocyanate (i.e., 1,3-bis(2-isocyanatoprop-2-yl)benzene) or toluene diisocyanate.

Also possible is the use of polyisocyanates containing isocyanurate, biuret, allophanate, iminooxadiazinedione, urethane, urea, carbodiimide and/or uretdione groups.

Preferred for use as polyisocyanates are saturated isocyanates, with particular preference being given to the polyisocyanates selected from the group of isophorone diisocyanate and m-tetramethylxylylene diisocyanate.

It is preferred for the reaction of polyester diols with polyisocyanates to be carried out in the presence of compounds for introducing further carboxyl groups into the polyurethane (P). For this purpose it is possible for example to use α,α dimethylolalkanic acids such as 2,2-dimethylo-leic acid, 2,2-dimethylolpropionic acid (DMPA), 2,2-dimethylolbutyric acid, and 2,2-dimethylolpentanoic acid, with 2,2-dimethylolpropionoic acid in particular being preferred.

The at least one polyester diol preferably used is reacted with the at least one polyisocyanate, preferably in the presence of DMPA, to give an intermediate having isocyanate groups. This reaction takes place according to the well-known methods of polyurethane chemistry (cf., e.g., Kunstoff-Handbuch [Plastics Handbook], volume 7: Polyurethanes, edited by Dr. G. Oertel, Carl Hanser Verlag, Munich-Vienna 1983). The reaction can be carried out solventlessly, but is preferably carried out in solvents which are inert toward isocyanate groups and are miscible with water. There is advantage in using solvents which as well as the properties described above are also good solvents for the polyurethanes prepared and can easily be separated from aqueous mixtures. Especially suitable solvents are acetone and methyl ethyl ketone.

The fractions of the polyester diol, of the polyisocyanate and of the DMPA to be used are preferably selected such that the overall ratio of all hydroxyl groups from the polyester diol and DMPA to the isocyanate groups of the polyisocyanate results in a reaction product which has a residual isocyanate content in the range from 0.08 to 0.1 wt %.

Following the above reaction, there is preferably a reaction of the resulting intermediate, containing isocyanate groups, with at least one compound which contains at least one olefinically unsaturated group and has at least one functional group that is reactive toward isocyanate groups. The group that is reactive toward isocyanate groups is represented in particular by hydroxyl groups and also by primary and secondary amines, with hydroxyl groups in particular being preferred. Especially preferred is for the compound used to have precisely one olefinically unsaturated group.

Preferred for use as alcohols in the so-called chain extension reaction are (meth)acrylate-based, monoolefinically unsaturated alcohols, monoolefinically unsaturated alcohols having allyl groups, and other monoolefinically unsaturated alcohols containing vinyl groups.

Particularly suitable are monounsaturated esters of (meth) acrylic acid with a saturated aliphatic radical that is substituted by a hydroxyl group, such as, in particular, 2-hydroxyethyl (meth)acrylate, 2-hydroxypropyl (meth)acrylate, 3-hydroxypropyl (meth)acrylate, 3-hydroxybutyl (meth) acrylate and 4-hydroxybutyl (meth)acrylate, with 2-hydroxyethyl (meth)acrylate being especially preferred.

The polyurethane (P) may be admixed to any of the monomer mixtures (A), (B) or (C) in the emulsion polymerization. It is possible here for the polyurethane to be admixed only to one of the monomer mixtures (A), (B) or (C). Where admixing takes place to the monomer mixture (A), the polyurethane is copolymerized into the seed of the polymer SCS. Where the admixing is to the monomer mixture (B), the polyurethane (P) is incorporated into the core of the polymer SCS. In the case of admixing of the polyurethane (P) to the monomer mixture (C), the polymerization is into the shell of the polymer SCS. Also possible, however, is for the polyurethane (P) to be admixed not only to one of the monomer mixtures, but for two of the three monomer mixtures (A), (B), and (C) to contain a polyurethane (P). It is also possible, furthermore, for all three monomer mixtures (A), (B), and (C) to be admixed with a polyurethane (P). In that case the polyurethane (P) is polymerized into the seed and into the core and into the shell of the polymer SCS.

In principle the polyurethane (P) may be added to the mixtures (A), (B) and/or (C) in a very wide weight-percentage fractional range. It is preferred for the fraction of the polyurethane (P) in the respective mixtures (A), (B) or (C) to be in a range from 0.1 to 10.0 wt %, based on the solids content of the respective monomer mixture (A), (B) or (C).

The effect of adding the polyurethane (P) to the monomer mixtures (A), (B) or (C) is that it is copolymerized as a comonomer, and the polyurethane (P) additionally has an emulsifying effect. In order to obtain a sufficient emulsifier effect, however, a distinction is to be made as to whether the polyurethane (P) is admixed to the monomer mixture (A) or to the monomer mixtures (B) and/or (C). Where the polyurethane (P) is added to the monomer mixture (A), relatively large quantities of the polyurethane (P) are needed in order to ensure sufficient micelle formation at the start of the emulsion polymerization. Sufficient micelle formation is necessary in order to be able to control the desired particle size. It is therefore preferred for the fraction of the polyurethane in the monomer mixture (A) to be 0.1 to 10 wt %, preferably 1 to 9 wt %, more preferably 5 to 8 wt %, based on the solids content of the monomer mixture (A).

In the case of the admixing of the polyurethane (P) to the monomer mixtures (B) and/or (C), the quantities of polyurethane (P) required are generally lower for a sufficient emulsifier effect to be achieved. Where the polyurethane (P) is admixed to the monomer mixture (B) and/or (C), therefore, it is preferred for the fraction of the polyurethane (P) to be from 0.1 to 1.0 wt %, preferably 0.15 to 0.8 wt %, more preferably 0.2 to 0.6 wt %, based on the solids content of the respective monomer mixture (B) or (C). It is, however, also possible, especially in relation to the monomer mixtures (B) and (C), for higher fractions of the polyurethane (P) to be admixed to the monomer mixtures.

Since the polyurethane (P) can be admixed to all three monomer mixtures (A), (B), and (C), it is preferred for the fraction of the polyurethane (P) to be from 0.05 to 1.8 wt %, preferably from 0.08 to 1.6 wt %, and more preferably from 0.1 to 1.5 wt %, based on the solids content of the aqueous dispersion.

The mixtures (A), (B), and (C) are mixtures of olefinically unsaturated monomers. For the purposes of this invention, a distinction is made in each case between the monomer mixtures (A), (B), and (C), and the corresponding monomer mixtures comprising at least one polyurethane containing at least one olefinically unsaturated group. The monomer mixtures (A), (B), and (C), and the polymers (a), (b), and (c) prepared from these monomer mixtures, have the characteristics described below before the polyurethane (P) is admixed.

Olefinically unsaturated monomers suitable in principle may be mono- or polyolefinically unsaturated.

Described first of all below are monomers which can be used in principle and which are suitable across all mixtures (A), (B), and (C), and are monomers that are optionally preferred. Specific preferred embodiments of the individual mixtures will be addressed thereafter. It is preferred for mixtures (A), (B), and (C) each to consist of the monomers described correspondingly hereinafter.

It is preferred that the monomer mixtures (A), (B), and (C) contain no macromonomers. The concept of the macromonomer is known to the skilled person. It refers to polymers or oligomers which have a reactive functional group and function as a monomer. As a result of this, the macromonomer introduces a polymeric or oligomeric side chain into the target polymer.

Examples of suitable monoolefinically unsaturated monomers include, in particular, (meth)acrylate-based monoolefinically unsaturated monomers, monoolefinically unsaturated monomers containing allyl groups, and other monoolefinically unsaturated monomers containing vinyl groups, such as vinylaromatic monomers, for example. The term (meth)acrylic or (meth)acrylate for the purposes of the present invention encompasses both methacrylates and acrylates. Preferred for use at any rate, although not necessarily exclusively, are (meth)acrylate-based monoolefinically unsaturated monomers.

(Meth)acrylate-based, monoolefinically unsaturated monomers may be, for example, (meth)acrylic acid and esters, nitriles, or amides of (meth)acrylic acid.

Preference is given to esters of (meth)acrylic acid having a radical R which is not olefinically unsaturated.

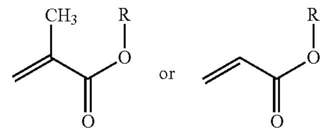

The radical R may be saturated aliphatic, aromatic, or mixed saturated aliphatic-aromatic. Aliphatic radicals for the purposes of the present invention are all organic radicals which are not aromatic. Preferably the radical R is aliphatic.

The saturated aliphatic radical may be a pure hydrocarbon radical or it may include heteroatoms from bridging groups (for example, oxygen from ether groups or ester groups) and/or may be substituted by functional groups containing heteroatoms (alcohol groups, for example). For the purposes of the present invention, therefore, a clear distinction is made between bridging groups containing heteroatoms and functional groups containing heteroatoms (that is, terminal functional groups containing heteroatoms).

Preference is given at any rate, though not necessarily exclusively, to using monomers in which the saturated aliphatic radical R is a pure hydrocarbon radical (alkyl radical), in other words one which does not include any heteroatoms from bridging groups (oxygen from ether groups, for example) and is also not substituted by functional groups (alcohol groups, for example).

If R is an alkyl radical, it may for example be a linear, branched, or cyclic alkyl radical. Such an alkyl radical may of course also have linear and cyclic or branched and cyclic structural components. The alkyl radical preferably has 1 to 20, more preferably 1 to 10, carbon atoms.

Particularly preferred monounsaturated esters of (meth) acrylic acid with an alkyl radical are methyl (meth)acrylate, ethyl (meth)acrylate, propyl (meth)-acrylate, isopropyl (meth)acrylate, n-butyl (meth)-acrylate, isobutyl (meth) acrylate, tert-butyl (meth)-acrylate, amyl (meth)acrylate, hexyl (meth)acrylate, ethylhexyl (meth)acrylate, 3,3,5-trimethylhexyl (meth)-acrylate, stearyl (meth)acrylate, lauryl (meth)-acrylate, cycloalkyl (meth)acrylates, such as cyclopentyl (meth)acrylate, isobornyl (meth)acrylate, and also cyclohexyl (meth)acrylate, with very particular preference being given to n- and tert-butyl (meth)-acrylate and to methyl methacrylate.

Examples of other suitable radicals R are saturated aliphatic radicals which comprise functional groups containing heteroatoms (for example, alcohol groups or phosphoric ester groups).

Suitable monounsaturated esters of (meth)acrylic acid with a saturated aliphatic radical substituted by one or more hydroxyl groups are 2-hydroxyethyl (meth)-acrylate, 2-hydroxypropyl (meth)acrylate, 3-hydroxy-propyl (meth)acrylate, 3-hydroxybutyl (meth)acrylate, and 4-hydroxybutyl (meth)acrylate, with very particular preference being given to 2-hydroxyethyl (meth)-acrylate.

Suitable monounsaturated esters of (meth)acrylic acid with phosphoric ester groups are, for example, phosphoric esters of polypropylene glycol monomethacrylate, such as the commercially available Sipomer PAM 200 from Rhodia.

Possible further monoolefinically unsaturated monomers containing a vinyl group are monomers which are different from the above-described acrylate-based monomers and which have a radical R' on the vinyl group that is not olefinically unsaturated.

The radical R' may be saturated aliphatic, aromatic, or mixed saturated aliphatic-aromatic, with preference being given to aromatic and mixed saturated aliphatic-aromatic radicals in which the aliphatic components represent alkyl groups.

Particularly preferred vinylic, olefinically unsaturated monomers are vinylaromatic hydrocarbons, in particular vinyltoluene, alpha-methylstyrene, and especially styrene, or

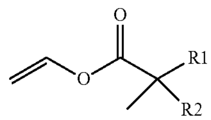

where the radicals R1 and R2 are alkyl radicals with a total of 7 carbon atoms. Latter monomers are available commercially under the name VeoVa 10 from Momentive.

Further monomers suitable in principle are olefinically unsaturated monomers such as acrylonitrile, methacrylonitrile, acrylamide, methacrylamide, N,N-dimethylacrylamide, vinyl acetate, vinyl propionate, vinyl chloride, N-vinylpyrrolidone, N-vinylcaprolactam, N-vinylformamide, N-vinylimidazole, N-vinyl-2-methylimidazoline, and further unsaturated alpha-beta-carboxylic acids.

Examples of suitable polyolefinically unsaturated monomers include esters of (meth)acrylic acid with an olefinically unsaturated radical R", and allyl ethers of mono- or polyhydric alcohols. The radical R" may be an allyl radical or a (meth)acryloyl radical.

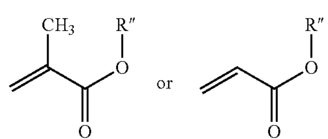

Preferred polyolefinically unsaturated monomers include ethylene glycol di(meth)acrylate, 1,2-propylene glycol di(meth)acrylate, 2,2-propylene glycol di(meth)-acrylate, butane-1,4-diol di(meth)acrylate, neopentyl glycol di(meth) acrylate, 3-methylpentanediol di(meth)-acrylate, diethylene glycol di(meth)acrylate, triethylene glycol di(meth)acrylate, tetraethylene glycol di(meth)acrylate, dipropylene glycol di(meth)-acrylate, tripropylene glycol di(meth)acrylate, hexanediol di(meth)acrylate, and allyl (meth)acrylate.

Furthermore, preferred polyolefinically unsaturated compounds encompass acrylic and methacrylic esters of alcohols having more than two OH groups, such as, for example, trimethylolpropane tri(meth)acrylate or glycerol tri(meth) acrylate, but also trimethylolpropane di(meth)acrylate monoallyl ether, trimethylolpropane (meth)acrylate diallyl ether, pentaerythritol tri(meth)acrylate monoallyl ether, pentaerythritol di(meth)acrylate diallyl ether, pentaerythritol (meth)-acrylate triallyl ether, triallylsucrose, and penta-allylsucrose.

Also possible are allyl ethers of mono- or polyhydric alcohols, such as trimethylolpropane monoallyl ether, for example.

Where used, preferred polyolefinically unsaturated monomers are hexanediol diacrylate and/or allyl (meth)acrylate.

With regard to the monomer mixtures (A), (B), and (C) used in the individual polymerization stages, before admixing of polyurethane (P), there are specific conditions to be observed, which are set out below.

First of all it should be stated that the mixtures (A), (B), and (C) are at any rate different from one another. They therefore each contain different monomers and/or different proportions of at least one defined monomer. The description hereinafter of the specific monomer mixtures (A), (B), and (C) pertains in each case only to the corresponding monomer mixture, i.e., without admixing of polyurethane (P).

Mixture (A) comprises at least 50 wt %, preferably at least 55 wt %, of olefinically unsaturated monomers having a water solubility of less than 0.5 g/l at 25° C. One such preferred monomer is styrene.

The solubility of the monomers in water can be determined via establishment of equilibrium of the gas space above the aqueous phase (in analogy to the reference X.-S. Chai, Q. X. Hou, F. J. Schork, Journal of Applied Polymer Science Vol. 99, 1296-1301 (2006)).

For this purpose, in a 20 ml gas space sample tube, to a defined volume of water, preferably 2 ml, a mass of the respective monomer is added which is of a magnitude such that this mass can at any rate not be dissolved completely in the selected volume of water. Additionally an emulsifier is added (10 ppm, based on total mass of the sample mixture). In order to obtain the equilibrium concentration, the mixture is shaken continually. The supernatant gas phase is replaced by inert gas, and so an equilibrium is established again. In the gas phase withdrawn, the fraction of the substance to be detected is measured in each case (preferably by gas chromatography). The equilibrium concentration in water can be determined by plotting the fraction of the monomer in the gas phase. The slope of the curve changes from a virtually constant value (S1) to a significantly negative slope (S2) as soon as the excess monomer fraction has been removed from the mixture. The equilibrium concentration here is reached at the point of intersection of the straight line with the slope S1 and of the straight line with the slope S2. The determination described is carried out at 25° C.

The monomer mixture (A) preferably contains no hydroxy-functional monomers. Likewise preferably, the monomer mixture (A) contains no acid-functional monomers.

Very preferably the monomer mixture (A) contains no monomers at all that have functional groups containing heteroatoms. This means that heteroatoms, if present, are present only in the form of bridging groups. This is the case, for example, in the monoolefinically unsaturated monomers described above that are (meth)acrylate-based and possess an alkyl radical as radical R.

In one particularly preferred embodiment, the monomer mixture (A) comprises at least one monounsaturated ester of (meth)acrylic acid with an alkyl radical and at least one monoolefinically unsaturated monomer containing vinyl groups, with a radical arranged on the vinyl group that is aromatic or that is mixed saturated aliphatic-aromatic, in which case the aliphatic fractions of the radical are alkyl groups.

The monomers present in the mixture (A) are selected such that a polymer (a) prepared from them possesses a glass transition temperature of 10 to 65° C., preferably of 30 to 50° C.

The glass transition temperature $T_g$ for the purposes of the invention is determined experimentally on the basis of DIN 51005 "Thermal Analysis (TA)—terms" and DIN 53765 "Thermal Analysis—Dynamic Scanning Calorimetry (DSC)". This involves weighing out a 15 mg sample into a sample boat and introducing it into a DSC instrument. After cooling to the start temperature, 1st and 2nd measurement runs are carried out with inert gas flushing ($N_2$) of 50 ml/min with a heating rate of 10 K/min, with cooling to the start temperature again between the measurement runs. Measurement takes place customarily in the temperature range from about 50° C. lower than the expected glass transition temperature to about 50° C. higher than the glass transition temperature. The glass transition temperature for the purposes of the present invention, in accordance with DIN 53765, section 8.1, is that temperature in the 2nd measurement run at which half of the change in the specific heat capacity (0.5 delta $c_p$) is reached. This temperature is determined from the DSC diagram (plot of the heat flow against the temperature). It is the temperature at the point of intersection of the midline between the extrapolated baselines, before and after the glass transition, with the measurement plot.

For a useful estimation of the glass transition temperature to be expected in the measurement, the known Fox equation can be employed (c.f. T. G. Fox, Bull. Am. Phys. Soc. 1 (1956) 123). Since the Fox equation represents a good approximation, based on the glass transition temperatures of the homopolymers and their parts by weight, without incorporation of the molecular weight, it can be used as a guide to the skilled person in the synthesis, allowing a desired glass transition temperature to be set via a few goal-directed experiments.

The polymer prepared in stage i. by the emulsion polymerization of the monomer mixture (A) is also called seed.

The seed possesses preferably a particle size of 20 to 125 nm (measured by means of dynamic light scattering (photon correlation spectroscopy) according to DIN ISO 13321), the particle size for the purposes of the present invention referring to the measured average particle diameter (Z-average mean). The particle size can be measured in concrete terms using, for example, a "Malvern Nano S90" (from Malvern Instruments).

Monomer mixture (B) comprises at least one polyolefinically unsaturated monomer, preferably at least one diolefinically unsaturated monomer. One such preferred monomer is hexanediol diacrylate.

The monomer mixture (B) preferably contains no hydroxy-functional monomers. Likewise preferably, the monomer mixture (B) contains no acid-functional monomers.

Very preferably the monomer mixture (B) contains no monomers at all with functional groups containing heteroatoms. This means that heteroatoms, if present, are present only in the form of bridging groups. This is the case, for example, in the above-described monoolefinically unsaturated monomers which are (meth)acrylate-based and possess an alkyl radical as radical R.

In one particularly preferred embodiment, the monomer mixture (B), as well as the at least one polyolefinically unsaturated monomer, includes at any rate the following further monomers: first of all, at least one monounsaturated ester of (meth)acrylic acid with an alkyl radical, and secondly at least one monoolefinically unsaturated monomer containing vinyl groups and having a radical located on the vinyl group that is aromatic or that is a mixed saturated aliphatic-aromatic radical, in which case the aliphatic fractions of the radical are alkyl groups.

The fraction of polyunsaturated monomers is preferably from 0.05 to 3 mol %, based on the total molar amount of monomers in the monomer mixture (B).

The monomers present in the mixture (B) are selected such that a polymer (b) prepared therefrom possesses a glass transition temperature of −35 to 15° C., preferably of −25 to +7° C.

The polymer prepared in the presence of the seed in stage ii. by the emulsion polymerization of the monomer mixture (B) is also referred to as the core. After stage ii., then, the result is a polymer which comprises seed and core.

The polymer which is obtained after stage ii. preferably possesses a particle size of 80 to 280 nm, preferably 120 to 250 nm.

The monomers present in the mixture (C) are selected such that a polymer prepared therefrom possesses a glass transition temperature of −50 to 15° C., preferably of −20 to +12° C.

The olefinically unsaturated monomers of this mixture (C) are preferably selected such that the resulting polymer, comprising seed, core, and shell, has an acid number of 10 to 25.

Accordingly, the mixture (C) preferably comprises at least one alpha-beta unsaturated carboxylic acid, especially preferably (meth)acrylic acid.

The olefinically unsaturated monomers of the mixture (C) are further preferably selected such that the resulting polymer, comprising seed, core, and shell, has an OH number of 0 to 30, preferably 10 to 25.

All of the aforementioned acid numbers and OH numbers are values calculated on the basis of the monomer mixtures (A), (B), and (C) employed overall, without admixing of polyurethane (P).

In one particularly preferred embodiment, the monomer mixture (C) comprises at least one alpha-beta unsaturated carboxylic acid and at least one monounsaturated ester of (meth)acrylic acid having an alkyl radical substituted by a hydroxyl group.

In one especially preferred embodiment, the monomer mixture (C) comprises at least one alpha-beta unsaturated carboxylic acid, at least one monounsaturated ester of (meth) acrylic acid having an alkyl radical substituted by a hydroxyl group, and at least one monounsaturated ester of (meth) acrylic acid having an alkyl radical.

Where reference is made, in the context of the present invention, to an alkyl radical, without further particularization, what is always meant by this is a pure alkyl radical without functional groups and heteroatoms.

The polymer prepared in the presence of seed and core in stage iii. by the emulsion polymerization of the monomer mixture (C) is also referred to as the shell. The result after stage iii., then, is a polymer which comprises seed, core, and shell.

Following its preparation, the polymer SCS preferably possesses a particle size of 100 to 500 nm, more preferably 125 to 400 nm, very preferably from 130 to 300 nm.

The fractions of the monomer mixtures are preferably harmonized with one another as follows. The fraction of the mixture (A) is from 0.1 to 10 wt %, the fraction of the mixture (B) is from 60 to 80 wt %, and the fraction of the mixture (C) is from 10 to 30 wt %, based in each case on the sum of the individual amounts of the mixtures (A), (B), and (C).

The aqueous dispersion preferably possesses a pH of 5.0 to 9.0, more preferably 7.0 to 8.5, very preferably 7.5 to 8.5. The pH may be kept constant during the preparation itself, through the use of bases as identified further on below, for example, or else may be set deliberately after the polymer SCS has been prepared.

In especially preferred embodiments it is the case that the aqueous dispersion has a pH of 5.0 to 9.0 and the at least one polymer present therein has a particle size of 100 to 500 nm. Even more preferred range combinations are as follows: pH of 7.0 to 8.5 and a particle size of 125 to 400 nm, more preferably pH of 7.5 to 8.5 and a particle size of 130 to 300 nm.

The stages i. to iii. described are carried out preferably without addition of acids or bases known for the setting of the pH. If in the preparation of the polymer, for example, carboxy-functional monomers are then used, as is preferred in the context of stage iii., the pH of the dispersion may be less than 7 after the end of stage iii. Accordingly, an addition of base is needed in order to adjust the pH to a higher value, such as, for example, a value within the preferred ranges.

It follows from the above that the pH preferably after stage iii. is preferably adjusted or has to be adjusted, in particular through addition of a base such as an (organic) nitrogen-containing base, such as an amine such as ammonia, trimethylamine, triethylamine, tributylamines, dimethylaniline, triphenylamine, N,N-dimethylethanolamine, methyldiethanolamine, or triethanolamine, and also by addition of sodium hydrogencarbonate or borates, and also mixtures of the aforesaid substances. This, however, does not rule out the possibility of adjusting the pH before, during, or after the emulsion polymerizations or else between the individual emulsion polymerizations. It is likewise possible for there to be no need at all for the pH to be adjusted to a desired value, owing to the choice of the monomers.

The measurement of the pH here is carried out preferably using a pH meter (for example, Mettler-Toledo S20 SevenEasy pH meter) having a combined pH electrode (for example, Mettler-Toledo InLab® Routine).

The solids content of the aqueous dispersion is preferably 15% to 40% and more preferably 20% to 30%.

The dispersion comprising a polymer-SCS is aqueous. The expression "aqueous" is known to the skilled person. The system involved comprises primarily water as solvent, and comprises organic solvents only in minor proportions. The extent to which the expression "aqueous" is to be understood in preferred embodiments may differ between different systems under consideration (such as the aqueous dispersion or the aqueous basecoat material).

It is further preferred for the percentage sum of the solids content of the dispersion and the fraction of water in the dispersion to be at least 80 wt %, preferably at least 90 wt %. Preferred in turn are ranges from 80 to 99 wt %, especially 90 to 97.5 wt %. In this figure, the solids content, which traditionally only possesses the unit "%", is reported in "weight %". Since the solids content ultimately also represents a percentage weight figure, this form of representation is justified. Where, for example, a dispersion has a solids content of 25% and a water content of 70 wt %, the above-defined percentage sum of the solids content and the fraction of water amounts to 95 wt %, therefore.

The dispersion accordingly consists very largely of water and of the polymer SCS, and environmentally burdensome components, such as organic solvents in particular, are present only in minor proportions or not at all.

The Pigmented Aqueous Basecoat Material

The present invention further relates to a pigmented aqueous basecoat material which comprises at least one aqueous dispersion of the invention.

A basecoat material is a color-imparting intermediate coating material which is used in automobile finishing and general industrial coating. It is generally applied to a metallic or plastics substrate, which has been pretreated with surfacer or primer-surfacer, and occasionally is also applied directly to the plastics substrate. Existing finishes which may still require pretreatment (by being abraided, for example) may also serve as substrates. In order to protect a basecoat from, in particular, environmental influences, at least one additional clearcoat is applied to it.

The fraction of the at least one aqueous dispersion, based on the total weight of the aqueous pigmented basecoat material, is preferably 5 to 60 wt %, more preferably 10 to 50 wt %, and very preferably 20 to 45 wt %.

The fraction of the polymers SCS originating from the aqueous dispersions, based on the total weight of the aqueous basecoat material, is preferably from 1 to 24 wt %, more preferably 2.5 to 20.0 wt %, and very preferably 3 to 18.0 wt %.

Determining or specifying the fraction of the polymers originating from the dispersions for inventive use in the aqueous basecoat material may be done via the determination of the solids content (also called nonvolatile fraction or solids fraction) of an aqueous dispersion which is to be used in the basecoat material.

In the case of a possible particularization to basecoat materials comprising preferred aqueous dispersions in a specific proportional range, the following applies. The aqueous dispersions which do not fall within the preferred group may of course still be present in the aqueous basecoat material. In that case the specific proportional range applies only to the preferred group of aqueous dispersions. It is preferred nonetheless for the total proportion of aqueous dispersions, consisting of dispersions from the preferred group and dispersions which are not part of the preferred group, to be subject likewise to the specific proportional range.

In the case of a restriction to a proportional range of to 50 wt % and to a preferred group of aqueous dispersions, therefore, this proportional range evidently applies initially only to the preferred group of aqueous dispersions. In that case, however, it would be preferable for there to be likewise from 10 to 50 wt % in total present of all originally encompassed aqueous dispersions, consisting of aqueous dispersions from the preferred group and aqueous dispersions which do not form part of the preferred group. If, therefore, 35 wt % of aqueous dispersions of the preferred group are used, not more than 15 wt % of the aqueous dispersions of the non-preferred group may be used.

The stated principle is valid, for the purposes of the present invention, for all stated components of the basecoat material and for their proportional ranges—for example, for the pigments specified later on below, or else for the crosslinking agents specified later on below, such as melamine resins.

The aqueous basecoat material generally comprises coloring pigments and/or optical-effect pigments.

Such color pigments and effect pigments are known to the skilled person and are described in, for example, Römpp-Lexikon Lacke and Druckfarben, Georg Thieme Verlag, Stuttgart, N.Y., 1998, pages 176 and 451.

Effect pigments are, for example, metallic effect pigments such as aluminum pigments, gold bronzes, oxidized bronzes and/or iron oxide-aluminum pigments, pearlescent pigments such as, for example, pearl essence, basic lead carbonate, bismuth oxide chloride and/or metal oxide-mica pigments and/or other effect pigments such as micronized titanium dioxide, lamellar graphite, lamellar iron oxide, multilayer effect pigments formed from PVD films, and/or liquid crystal polymer pigments.

The fraction of the pigments may be for example in the range from 1 to 40 wt %, preferably 2 to 20 wt %, more preferably 5 to 15 wt %, based on the total weight of the pigmented aqueous basecoat material.

Basecoat material of the invention may comprise binders curable physically, thermally, or both thermally and with actinic radiation.

In the context of the present invention, the term “physical curing” means the formation of a film through loss of solvent from polymer solutions or polymer dispersions. Typically, no crosslinking agents are necessary for this curing (cf. Römpp Lexikon, Lacke und Druckfarbern, Georg Thieme Verlag, 1998, p. 274).

In the context of the present invention, the term “thermal curing” means the crosslinking of a coating film by chemical reaction, with either a separate crosslinking agent or else self-crosslinking binders being employed in the parent coating material (cf. Römpp Lexikon, Lacke und Druckfarbern, Georg Thieme Verlag, 1998, p. 274). The crosslinking agent contains reactive functional groups which are complementary to the reactive functional groups present in the binders. This is commonly referred to by those in the art as external crosslinking. Where the complementary reactive functional groups or autoreactive functional groups—that is, groups which react with groups of the same kind—are already present in the binder molecules, the binders present are self-crosslinking. Examples of suitable complementary reactive functional groups and autoreactive functional groups are known from German patent application DE 199 30 665 A1, page 7, line 28 to page 9, line 24.

For the purposes of the present invention, actinic radiation means electromagnetic radiation such as near infrared (NIR), UV radiation, more particularly UV radiation, and particulate radiation such as electron radiation. Curing by UV radiation is commonly initiated by radical or cationic photoinitiators.

Where thermal curing and curing with actinic radiation are employed in unison, the term “dual cure” is also used.

In the present invention preference is given to basecoat materials which are curable thermally or both thermally and with actinic radiation, i.e., by “dual cure”.

Especially preferred basecoat materials are those which comprise as binder a polyacrylate resin and as crosslinking agent an aminoplast resin or a blocked or nonblocked polyisocyanate, preferably an aminoplast resin. Among the aminoplast resins, melamine resins are especially preferred.

As well as the aqueous dispersion of the invention, basecoat materials of the invention preferably comprise a further binder, preferably a polyurethane resin.

The polyurethane resin preferably present may be ionically and/or nonionically hydrophilically stabilized. In preferred embodiments of the present invention the polyurethane resin is ionically hydrophilically stabilized. The preferred polyurethane resins are linear or contain instances of branching. The polyurethane resin is more preferably one in whose presence olefinically unsaturated monomers have been polymerized. This polyurethane resin may be present alongside the polymer originating from the polymerization of the olefinically unsaturated monomers, without these polymers being bonded covalently to one another. Equally, however, the polyurethane resin may also be bonded covalently to the polymer originating from the polymerization of the olefinically unsaturated monomers. The olefinically unsaturated monomers are preferably monomers containing acrylate groups and/or methacrylate groups. It is likewise preferred for the monomers containing acrylate and/or methacrylate groups to be used in combination with other olefinically unsaturated compounds which contain no acrylate or methacrylate groups. Olefinically unsaturated monomers attached to the polyurethane resin are more preferably monomers containing acrylate groups or methacrylate groups, thereby producing polyurethane (meth)acrylates. Very preferably the polyurethane resin is a polyurethane (meth)acrylate. The polyurethane resin present with preference is curable physically, thermally, or both thermally and with actinic radiation. More particularly it is curable either thermally or both thermally and with actinic radiation. With particular preference the polyurethane resin comprises reactive functional groups through which external crosslinking is possible.

Suitable saturated or unsaturated polyurethane resins are described, for example, in German patent application DE 199 14 896 A1, column 1, lines 29 to 49 and column 4, line 23 to column 11, line 5, German patent application DE 199 48 004 A1, page 4, line 19 to page 13, line 48, European patent application EP 0 228 003 A1, page 3, line 24 to page 5, line 40, European patent application EP 0 634 431 A1, page 3, line 38 to page 8, line 9, or international patent application WO 92/15405, page 2, line 35 to page 10, line 32, German patent application DE 4437535 A1, page 7, line 55 to page 8, line 23, international patent application WO 91/15528, page 23, line 29 to page 24, line 24.

The polyurethane resin is prepared using preferably the aliphatic, cycloaliphatic, aliphatic-cycloaliphatic, aromatic, aliphatic-aromatic and/or cycloaliphatic-aromatic polyisocyanates that are known to the skilled person.

As alcohol component for preparing the polyurethane resins, preference is given to using the saturated and unsaturated polyols of relatively high molecular mass and of low molecular mass, and also, optionally, monoalcohols, in minor amounts, that are known to the skilled person. Low molecular mass polyols used are more particularly diols and, in minor amounts, triols, for introducing instances of branching. Examples of suitable polyols of relatively high molecular mass are saturated or olefinically unsaturated polyester polyols and/or polyether polyols. Relatively high molecular mass polyols used are more particularly polyester polyols, especially those having a number-average molecular weight of 400 to 5000 g/mol.

For hydrophilic stabilization and/or for increasing the dispersibility in aqueous medium, the polyurethane resin preferably present may contain particular ionic groups and/or groups which can be converted to ionic groups (potentially ionic groups). Polyurethane resins of this kind are referred to in the context of the present invention as ionically hydrophilically stabilized polyurethane resins. Likewise present may be nonionic hydrophilically modifying groups. Preferred, however, are the ionically hydrophilically stabilized polyurethanes. In more precise terms, the modifying groups are alternatively functional groups which can be converted to cations by neutralizing agents and/or quaternizing agents, and/or cationic groups (cationic modification) or functional groups which can be converted to anions by neutralizing agents, and/or anionic groups (anionic modification) and/or nonionic hydrophilic groups (nonionic modification).

As the skilled person is aware, the functional groups for cationic modification are, for example, primary, secondary and/or tertiary amino groups, secondary sulfide groups and/or tertiary phosphine groups, more particularly tertiary amino groups and secondary sulfide groups (functional groups which can be converted to cationic groups by neutralizing agents and/or quaternizing agents). Mention should also be made of the cationic groups—groups prepared from the aforementioned functional groups using neutralizing agents and/or quaternizing agents known to those skilled in the art—such as primary, secondary, tertiary and/or quaternary ammonium groups, tertiary sulfonium groups and/or quaternary phosphonium groups, more particularly quaternary ammonium groups and tertiary sulfonium groups.

As is well known, the functional groups for anionic modification are, for example, carboxylic acid, sulfonic acid and/or phosphonic acid groups, more particularly carboxylic acid groups (functional groups which can be converted to anionic groups by neutralizing agents), and also anionic groups—groups prepared from the aforementioned functional groups using neutralizing agents known to the skilled person—such as carboxylate, sulfonate and/or phosphonate groups.

The functional groups for nonionic hydrophilic modification are preferably poly(oxyalkylene) groups, more particularly poly(oxyethylene) groups.

The ionically hydrophilic modifications can be introduced into the polyurethane resin through monomers which contain the (potentially) ionic groups. The nonionic modifications are introduced, for example, through the incorporation of poly(ethylene) oxide polymers as lateral or terminal groups in the polyurethane molecules. The hydrophilic modifications are introduced, for example, via compounds which contain at least one group reactive toward isocyanate groups, preferably at least one hydroxyl group. The ionic modification can be introduced using monomers which, as well as the modifying groups, contain at least one hydroxyl group. To introduce the nonionic modifications, preference is given to using the polyether diols and/or alkoxypoly(oxyalkylene) alcohols known to those skilled in the art.

The polyurethane resin may preferably be a graft polymer. More particularly it is a polyurethane resin grafted with olefinically unsaturated compounds, preferably olefinically unsaturated monomers. In this case, then, the polyurethane is grafted, for example, with side groups and/or side chains that are based on olefinically unsaturated monomers. These are more particularly side chains based on poly(meth)acrylates. Poly(meth)acrylates for the purposes of the present invention are polymers or polymeric radicals which comprise monomers containing acrylate and/or methacrylate groups, and preferably consist of monomers containing acrylate groups and/or methacrylate groups. Side chains based on poly(meth)acrylates are understood to mean side chains which are constructed during the graft polymerization, using monomers containing (meth)acrylate groups. In the graft polymerization, preference here is given to using more than 50 mol %, more particularly more than 75 mol %, especially 100 mol %, based on the total amount of the monomers used in the graft polymerization, of monomers containing (meth)acrylate groups.

The side chains described are introduced into the polymer preferably after the preparation of a primary polyurethane resin dispersion. In this case the polyurethane resin present in the primary dispersion may contain lateral and/or terminal olefinically unsaturated groups via which, then, the graft polymerization with the olefinically unsaturated compounds proceeds. The polyurethane resin for grafting may therefore be an unsaturated polyurethane resin (Z). The graft polymerization is in that case a radical polymerization of olefinically unsaturated reactants. Also possible, for example, is for the olefinically unsaturated compounds used for the graft polymerization to contain at least one hydroxyl group. In that case it is also possible first for there to be attachment of the olefinically unsaturated compounds via these hydroxyl groups through reaction with free isocyanate groups of the polyurethane resin. This attachment takes place instead of or in addition to the radical reaction of the olefinically unsaturated compounds with the lateral and/or terminal olefinically unsaturated groups optionally present in the polyurethane resin. This is then followed again by the graft polymerization via radical polymerization, as described earlier on above. The result in any case is polyurethane resins grafted with olefinically unsaturated compounds, preferably olefinically unsaturated monomers.

As olefinically unsaturated compounds with which the polyurethane resin (Z) is preferably grafted it is possible to use virtually all radically polymerizable, olefinically unsaturated, and organic monomers which are available to the skilled person for these purposes. A number of preferred monomer classes may be specified by way of example:

hydroxyalkyl esters of (meth)acrylic acid or of other alpha,beta-ethylenically unsaturated carboxylic acids, (meth)acrylic acid alkyl and/or cycloalkyl esters having up to 20 carbon atoms in the alkyl radical, ethylenically unsaturated monomers comprising at least one acid group, more particularly exactly one carboxyl group, such as (meth)acrylic acid, for example, vinyl esters of monocarboxylic acids which are branched in alpha-position and have 5 to 18 carbon atoms, reaction products of (meth)acrylic acid with the glycidyl ester of a monocarboxylic acid which is branched in alpha-position and has 5 to 18 carbon atoms, further ethylenically unsaturated monomers such as olefins (ethylene for example), (meth)acrylamides, vinylaromatic hydrocarbons (styrene for example), vinyl compounds such as vinyl chloride and/or vinyl ethers such as ethyl vinyl ether.

Used with preference are monomers containing (meth) acrylate groups, and so the side chains attached by grafting are poly(meth)acrylate-based side chains.

The lateral and/or terminal olefinically unsaturated groups in the polyurethane resin, via which the graft polymerization with the olefinically unsaturated compounds can proceed, are introduced into the polyurethane resin preferably via particular monomers. These particular monomers, in addition to an olefinically unsaturated group, also include, for example, at least one group that is reactive toward isocyanate groups. Preferred are hydroxyl groups and also primary and secondary amino groups. Especially preferred are hydroxyl groups.

The monomers described through which the lateral and/or terminal olefinically unsaturated groups may be introduced into the polyurethane resin may also, of course, be employed without the polyurethane resin being additionally grafted thereafter with olefinically unsaturated compounds. It is preferred, however, for the polyurethane resin to be grafted with olefinically unsaturated compounds.

The polyurethane resin preferably present may be a self-crosslinking and/or externally crosslinking binder. The polyurethane resin preferably comprises reactive functional groups through which external crosslinking is possible. In that case there is preferably at least one crosslinking agent in the pigmented aqueous basecoat material. The reactive functional groups through which external crosslinking is possible are more particularly hydroxyl groups. With particular advantage it is possible, for the purposes of the method of the invention, to use polyhydroxy-functional polyurethane resins. This means that the polyurethane resin contains on average more than one hydroxyl group per molecule.

The polyurethane resin is prepared by the customary methods of polymer chemistry. This means, for example, the polyaddition of polyisocyanates and polyols to polyurethanes, and the graft polymerization that preferably then follows with olefinically unsaturated compounds. These methods are known to the skilled person and can be adapted individually. Exemplary preparation processes and reaction conditions can be found in European patent EP 0521 928 B1, page 2, line 57 to page 8, line 16.

The polyurethane resin preferably present preferably possesses a number-average molecular weight of 200 to 30 000 g/mol, more preferably of 2000 to 20 000 g/mol. It further possesses, for example, a hydroxyl number of 0 to 250 mg KOH/g, but more particularly from 20 to 150 mg KOH/g. The acid number of the polyurethane resin is preferably 5 to 200 mg KOH/g, more particularly 10 to 40 mg KOH/g.

The aqueous basecoat material of the invention may further comprise at least one polyester, more particularly a polyester having a number-average molecular weight of 400 to 5000 g/mol, as binder. Such polyesters are described for example in DE 4009858 in column 6, line 53 to column 7, line 61 and column 10, line 24 to column 13, line 3.

There is preferably also at least one thickener present. Suitable thickeners are inorganic thickeners from the group of the phyllosilicates. Particularly suitable are lithium aluminum magnesium silicates.

As well as the inorganic thickeners, however, it is also possible to use one or more organic thickeners. These are preferably selected from the group consisting of (meth) acrylic acid-(meth)acrylate copolymer thickeners, for example the commercial product Rheovis® AS 1130 (BASF SE), and of polyurethane thickeners, for example the commercial product Rheovis® PU 1250 from BASF SE. (Meth) acrylic acid-(meth)acrylate copolymer thickeners are those which as well as acrylic acid and/or methacrylic acid also contain in copolymerized form one or more acrylic esters (i.e., acrylates) and/or one or more methacrylic esters (i.e., methacrylates). A feature common to the (meth)acrylic acid-(meth)acrylate copolymer thickeners is that in an alkaline medium, in other words at pH levels >7, more particularly >7.5, by formation of a salt of the acrylic acid and/or methacrylic acid, in other words by the formation of carboxylate groups, they exhibit a strong increase in viscosity. If (meth)acrylic esters are used which are formed from (meth)acrylic acid and a $C_1$-$C_6$ alkanol, the products are essentially nonassociative (meth)acrylic acid-(meth)acrylate copolymer thickeners, such as the abovementioned Rheovis AS 1130, for example. Essentially nonassociative (meth) acrylic acid-(meth)acrylate copolymer thickeners are also referred to in the literature as ASE thickeners ("Alkali Soluble/Swellable Emulsion" or dispersion). Also possible for use as (meth)acrylic acid-(meth)acrylate copolymer thickeners, however, are those known as HASE thickeners ("Hydrophobically Modified Anionic Soluble Emulsions" or dispersion). These are obtained by using as alkanols, instead of or in addition to the $C_1$-$C_6$ alkanols, those having a larger number of carbon atoms, as for example 7 to 30, or 8 to 20 carbon atoms. HASE thickeners have an essentially associative thickening effect. On account of their thickening properties, the (meth)acrylic acid-(meth)acrylate copolymer thickeners which can be used are not suitable as binder resins, and hence do not come under the physically, thermally, or both thermally and actinically curable binders that are identified as binders, and they are therefore explicitly different from the poly(meth)acrylate-based binders which can be employed in the basecoat material compositions of the invention. Polyurethane thickeners are the associative thickeners that are identified in the literature as HEUR ("Hydrophobically Modified Ethylene Oxide Urethane Rheology Modifiers"). Chemically these are nonionic, branched or unbranched, block copolymers composed of polyethylene oxide chains (sometimes also polypropylene oxide chains) which are linked to one another via urethane bonds and which carry terminal long-chain alkyl or alkylene groups having 8 to 30 carbon atoms.

Typical alkyl groups are, for example, dodecyl or stearyl groups; a typical alkenyl group is, for example, an oleyl group; a typical aryl group is the phenyl group; and a typical alkylated aryl group is, for example, a nonylphenyl group. On account of their thickening properties and structure, the polyurethane thickeners are not suitable as binder resins curable physically, thermally, or both thermally and physically. They are therefore explicitly different from the polyurethanes which can be used as binders in the basecoat material compositions of the invention.

Furthermore, the aqueous basecoat material may further comprise at least one adjuvant. Examples of such adjuvants are salts which can be decomposed thermally without residue or substantially without residue, resins as binders that are curable physically, thermally and/or with actinic radiation and are different from the aforementioned polyurethane resins, further (different from those mentioned above) crosslinking agents, organic solvents, reactive diluents, fillers, molecularly dispersely soluble dyes, nanoparticles, light stabilizers, antioxidants, deaerating agents, emulsifiers, slip additives, polymerization inhibitors, initiators of radical polymerizations, adhesion promoters, flow control agents, film-forming assistants, sag control agents (SCAs), flame retardants, corrosion inhibitors, waxes, siccatives, biocides, and matting agents.

Suitable adjuvants of the aforementioned kind are known, for example, from

German patent application DE 199 48 004 A1, page 14, line 4 to page 17, line 5,

German patent DE 100 43 405 C1 column 5, paragraphs [0031] to [0033].

They are used in the customary and known amounts.

The solids content of the basecoat materials of the invention may vary according to the requirements of the case in hand. The solids content is guided primarily by the viscosity required for application, more particularly for spray application, and so may be adjusted by the skilled person on the basis of his or her general art knowledge, optionally with assistance from a few exploratory tests.

The solids content of the basecoat materials is preferably 5 to 70 wt %, more preferably 10 to 65 wt %, and especially preferably 15 to 60 wt %.

The basecoat materials employed in accordance with the invention may be produced using the mixing assemblies and mixing techniques that are customary and known for producing basecoat materials.

The Method of the Invention and the Multicoat Paint System of the Invention

A further aspect of the present invention is a method for producing a multicoat paint system, where (1) a pigmented aqueous basecoat material is applied to a substrate, (2) a clearcoat material is applied to the resulting basecoat film, and then (3) the basecoat film is cured together with the clearcoat film, which comprises using in stage (1) a pigmented aqueous basecoat material which comprises at least one aqueous dispersion of the invention. All of the above observations relating to the dispersion of the invention and to the pigmented aqueous basecoat material are also valid in respect of the method of the invention. This is true more particularly also of all preferred, very preferred, and especially preferred features.

Said method is preferably used to produce multicoat color paint systems, effect paint systems, and color and effect paint systems.

The pigmented aqueous basecoat material of the invention is commonly applied to metallic or plastics substrates that have been pretreated with surfacer or primer-surfacer. Said basecoat material may optionally also be applied directly to the plastics substrate. Where a metallic substrate is to be coated, it is preferably further coated with an electrocoat system before the surfacer or primer-surfacer is applied. It is, however, also possible for the basecoat material to be applied directly to the electrocoat system.

Where a plastics substrate is being coated, it is preferably also pretreated before the surfacer or primer-surfacer is applied. The techniques most frequently employed for such pretreatment are those of flaming, plasma treatment, and corona discharge. Flaming is used with preference.

Application of the pigmented aqueous basecoat material of the invention to a metallic substrate may take place in the film thicknesses customary within the automobile industry, in the range, for example, of 5 to 100 micrometers, preferably 5 to 60 micrometers. This is done using spray application methods, for example compressed air spraying, airless spraying, high-speed rotation, electrostatic spray application (ESTA), alone or in conjunction with hot spray application, for example hot air spraying.

Following the application of the pigmented aqueous basecoat material, it can be dried preferably by known methods. For example, (1-component) basecoat materials, which are preferred, can be flashed off at room temperature for 1 to 60 minutes and subsequently dried, preferably at optionally slightly elevated temperatures of 30 to 90° C. Flashing and drying in the context of the present invention mean the evaporation of organic solvents and/or water, as a result of which the paint becomes drier but has not yet cured or not yet formed a fully crosslinked coating film.

Then a commercial clearcoat material is applied, by likewise common methods, the film thicknesses again being within the customary ranges, for example 5 to 100 micrometers.

After the clearcoat material has been applied, it can be flashed off at room temperature for 1 to 60 minutes, for example, and optionally dried. The clearcoat material is then cured together with the applied pigmented basecoat material. In the course of these procedures, crosslinking reactions occur, for example, to produce on a substrate a multicoat color and/or effect paint system of the invention. Curing takes place preferably thermally at temperatures from 60 to 200° C. Thermally curing basecoat materials are preferably those which comprise as crosslinking agent an aminoplast resin or a blocked or nonblocked polyisocyanate, preferably an aminoplast resin. Among the aminoplast resins, melamine resins are preferred.

Plastics substrates are coated basically in the same way as metallic substrates. Here, however, in general, curing takes place at significantly lower temperatures, of 30 to 90° C. Preference is therefore given to the use of two-component clearcoat materials.

The method of the invention can be used to paint metallic and nonmetallic substrates, more particularly plastics substrates, preferably automobile bodies or parts thereof.

The method of the invention can be used further for dual finishing in OEM finishing. This means that a substrate which has been coated by means of the method of the invention is painted for a second time, likewise by means of the method of the invention.

The invention relates further to multicoat paint systems which are producible by the method described above. These multicoat paint systems are to be referred to below as multicoat paint systems of the invention.

All of the above observations relating to the aqueous dispersion of the invention comprising the polymer SCS, to the pigmented aqueous basecoat material, and to the method of the invention are also valid in respect of said multicoat paint system. This is also true especially of all the preferred, more preferred, and most preferred features.

The multicoat paint systems of the invention are preferably multicoat color paint systems, effect paint systems, and color and effect paint systems.

A further aspect of the invention relates to the method of the invention, wherein said substrate from stage (1) is preferably a multicoat paint system having defect sites. This substrate/multicoat paint system, which possesses defect sites, is therefore an original finish, which is to be repaired or completely recoated. Automotive refinish pertains not only to OEM automotive refinishing but also to the automotive refinishing which takes place, for example, in a workshop.

The method of the invention is suitable accordingly for repairing defect sites on multicoat paint systems. Defect sites or film defects are generally faults on and in the coating, usually named according to their shape or their appearance. The skilled person is aware of a host of possible kinds of such film defects. They are described for example in Römpp-Lexikon Lacke and Druckfarben, Georg Thieme Verlag, Stuttgart, N.Y., 1998, page 235, "Film defects". They include, for example, deficiencies in adhesion which are manifested as flakes or in blistering. Unwanted changes in the mechanical properties, such as embrittlement or cracking, are considered to be film defects.

In one preferred embodiment of the method of the invention, the substrate from stage (1) is a multicoat paint system which has defect sites.

These multicoat paint systems are produced preferably on automobile bodies or parts thereof, by means of the method of the invention, identified above, in the context of automotive OEM finishing. Where such defects occur directly after OEM finishing has taken place, they are repaired immediately. The term "OEM automotive refinishing" is therefore also used. Where only small defect sites require repair, only the "spot" is repaired, and the entire body is not completely recoated (dual finishing). The former method is called "spot repair". The use of the method of the invention for remedying defects on multicoat paint systems (original finishes) of the invention in OEM automotive refinishing, therefore, is particularly preferred.

Where reference is made, in the context of the present invention, to the automotive refinish segment, in other words when the repair of defects is the topic, and the substrate specified is a multicoat paint system possessing defects, this of course means that this substrate/multicoat paint system with defects (original finish) is generally located on a plastic substrate or on a metallic substrate as described above.

So that the repaired site has no color difference from the rest of the original finish, it is preferred for the aqueous basecoat material used in stage (1) of the method of the invention for repairing defects to be the same as that which was used to produce the substrate/multicoat paint system with defects (original finish).

The observations above concerning the polymer of the invention and the aqueous pigmented basecoat material therefore are also valid for the use, under discussion, of the method of the invention for repairing defects on a multicoat paint system. This is also true in particular of all stated preferred, very preferred, and especially preferred features. It is additionally preferred for the multicoat paint systems of the invention that are to be repaired to be multicoat color paint systems, effect paint systems, and color and effect paint systems.

The above-described defect sites on the multicoat paint system of the invention can be repaired by means of the above-described method of the invention. For this purpose, the surface to be repaired on the multicoat paint system may initially be abraded. The abrading is preferably performed by partially sanding, or sanding off, only the basecoat and the clearcoat from the original finish, but not sanding off the primer layer and surfacer layer that are generally situated beneath them. In this way, during the refinish, there is no need in particular for renewed application of specialty primers and primer-surfacers. This form of abrading has become established especially in the OEM automotive refinishing segment, since here, in contrast to refinishing in a workshop, generally speaking, defects occur only in the basecoat and/or clearcoat region, but do not, in particular, occur in the region of the underlying surfacer and primer coats. Defects in the latter coats are more likely to be encountered in the workshop refinish sector. Examples include paint damage such as scratches, which are produced, for example, by mechanical effects and which often extend down to the substrate surface (metallic or plastics substrate).

After the abrading procedure, the pigmented aqueous basecoat material is applied to the defect site in the original finish, generally by pneumatic atomization. After the pigmented aqueous basecoat material has been applied, it can be dried by known techniques. For example, the basecoat material may be dried at room temperature for 1 to 60 minutes and subsequently dried at optionally slightly elevated temperatures of 30 to 80° C. Flashing and drying for the purposes of the present invention means evaporation of organic solvents and/or water, whereby the coating material is as yet not fully cured. For the purposes of the present invention it is preferred for the basecoat material to comprise an aminoplast resin, preferably a melamine resin, as crosslinking agent, and a binder that is reactive with this crosslinking agent.

A commercial clearcoat material is subsequently applied, by techniques that are likewise commonplace. Following application of the clearcoat material, it may be flashed off at room temperature for 1 to 60 minutes, for example, and optionally dried. The clearcoat material is then cured together with the applied pigmented basecoat material.

In the case of so-called low-temperature baking, curing takes place preferably at temperatures of 20 to 90° C. Preference here is given to using two-component clearcoat materials. If, as described above, an aminoplast resin is used as crosslinking agent, there is only slight crosslinking, if any, by the aminoplast resin in the basecoat film at these temperatures. Here, in addition to its function as a curing agent, the aminoplast resin also serves for plasticizing and may assist pigment wetting. Besides the aminoplast resins, non-blocked isocyanates may also be used. Depending on the nature of the isocyanate used, they crosslink at temperatures from as low as 20° C.

In the case of what is called high-temperature baking, curing is accomplished preferably at temperatures of 130 to 150° C. Here both one-component and two-component clearcoat materials are used. If, as described above, an aminoplast resin is used as crosslinking agent, there is crosslinking by the aminoplast resin in the basecoat film at these temperatures.

For repairing defects on multicoat paint systems, in other words when the substrate is an original finish with defects, preferably a multicoat paint system of the invention that exhibits defects, low-temperature baking is preferably employed.

A further aspect of the present invention is the use of the aqueous dispersions of the invention for producing pigmented aqueous basecoat materials.

The aqueous dispersions of the invention can also be used for improving adhesion in the finishing of metallic and plastics substrates. They can also be employed in automotive refinishing.

Where said pigmented aqueous basecoat materials are used in the finishing of metallic and plastics substrates, the use of the aqueous dispersion of the invention results in particular in an improvement in the adhesion between the basecoat film and the clearcoat film that is immediately adjacent to it. The dispersion of the invention is therefore used with preference for improving adhesion between basecoat film and clearcoat film in the finishing of metallic substrates and plastics substrates.

Where said pigmented aqueous basecoat materials are used in automotive refinishing, the use of the aqueous dispersion of the invention results in particular in an improvement in adhesion between basecoat and original finish. The aqueous dispersion of the invention is therefore likewise used with preference for improving the adhesion between basecoat film and original finish in automotive refinishing, more preferably in OEM automotive refinishing.

The adhesion difficulties affecting systems of the prior art are especially striking when the coated substrates are exposed to weathering. Corresponding weathering conditions can be simulated by condensation storage. The term "condensation storage" denotes the storage of coated substrates in a climatic chamber in accordance with CH test conditions as in DIN EN ISO 6270-2:2005-09.

The aqueous dispersions of the invention are therefore also used in particular to improve the adhesion after condensation storage. The adhesion is investigated preferably in a steam jet test according to test method A of DIN 55662: 2009-12.

When coated substrates are exposed to weathering, blisters and swelling are a common occurrence. The aqueous dispersions of the invention are therefore also used in particular to reduce or prevent the incidence of blisters and swelling in multicoat paint systems. The presence of blisters and swelling can be appraised visually.

The invention is elucidated below in the form of examples.

EXAMPLES

Description of Methods

Determination of Acid Number

The acid number is determined in accordance with DIN EN ISO 2114 (date: June 2002), using "method A". The acid number corresponds to the mass of potassium hydroxide in mg which is needed to neutralize 1 g of sample under the conditions specified in DIN EN ISO 2114. The reported acid number corresponds to the total acid number specified in the DIN standard.

Determination of OH Number

The OH number is determined according to DIN 53240-2 (date: November 2007). The OH groups are acetylated by reaction with excess acetic anhydride. The excess acetic anhydride is split into acetic acid by addition of water, and the total acetic acid is back-titrated with ethanolic KOH. The OH number indicates the amount of KOH in mg which is equivalent to the amount of acetic acid bound in the acetylation of 1 g of sample.

Determination of Number-Average and Weight-Average Molecular Weight

The number-average molecular weight (Mn) is determined by gel permeation chromatography (GPC) according to DIN 55672-1 (date: March 2016). Besides the number-average molecular weight, this method can be used to determine the weight-average molecular weight (Mw) and also the polydispersity d (ratio of weight-average molecular weight (Mw) to number-average molecular weight (Mn)) as well. Tetrahydrofuran is used as eluent. The determination takes place against polystyrene standards. The column material consists of styrene-divinylbenzene copolymers.

Determination of Surface Tension

The surface tension of the polyurethanes (P) was determined using the ring method of DIN EN 14210:2004-03 at 23° C. The corresponding instrument used was a ring/plate tensiometer from Lauda (Lauda TE1C with Du Noüy ring and Wilhelmy plate). The surface tension values are corrected as in DIN EN 14370:2014-11.

Determination of Initial Viscosity

The initial viscosity is determined after weighing out of the basecoat components in accordance with the preparation protocols described hereinafter, but before the adjustment of the respective materials to a pH of 8 using dimethylethanolamine and to a spray viscosity as mandated in the respective preparation protocol, by measurement of the viscosity under a mandated shearing load using a rotary viscometer (Rheolab QC instrument with C-LTD80/QC heating system from Anton Paar) at 23° C.

Determination of Solids Content or Nonvolatile Fraction

The nonvolatile fraction is determined according to DIN EN ISO 3251 (date: June 2008). In the determination of the solids content of the aqueous dispersion, 1 g of sample is weighed out into an aluminum dish dried beforehand, and is dried in a drying oven at 125° C. for 60 minutes, cooled in a desiccator and then weighed again. The residue, relative to the total amount of the sample introduced, corresponds to the nonvolatile fraction. The volume of the nonvolatile fraction may where necessary be determined optionally according to DIN 53219 (date: August 2009). In that case, in the determination of the solids content of the aqueous basecoat material, 1 g of sample is weighed out into an aluminum dish dried beforehand, and is dried in a drying oven at 130° C. for 60 minutes, cooled in a desiccator and then weighed again.

Determination of the Dry Film Thicknesses

The film thicknesses are determined as in DIN EN ISO 2808 (date: May 2007), method 12A, using the MiniTest® 3100-4100 instrument from ElectroPhysik.

Determination of Storage Stability

The storage stability of the coating compositions of the invention comprising an aqueous dispersion of the invention (or of comparative coating compositions) is determined by investigating them, before and after storage at 40° C. for 2 weeks, using a rotary viscometer conforming to DIN 53019-1 (date: September 2008) and calibrated as in DIN 53019-2 (date: February 2001) under temperature-controlled conditions (23.0° C.±0.2° C.). In this investigation, the samples are first sheared for 5 minutes at a shearing rate of 1000 s-1 (loading phase) and then sheared at a shear rate of 1 s-1 (unloading phase) for 8 minutes.

The average viscosity level during the loading phase (high-shear viscosity) and also the level after 8 minutes of unloading (low-shear viscosity) are determined from the measurement data, and the values before and after storage are compared with one another by calculation of the respective percentage changes.

Assessment of the Incidence of Pops and Runs

For determining the tendency toward popping and running in a coating composition of the invention (or a comparative coating composition), multicoat paint systems are produced as in DIN EN ISO 28199-1 (date: January 2010) and DIN EN ISO 28199-3 (date: January 2010) in accordance with the following general protocol:

A perforated steel panel with dimensions of 57 cm×20 cm (as per DIN EN ISO 28199-1, section 8.1, version A), coated with a standard cathodic electrocoat (CathoGuard® 800 from BASF Coatings GmbH), is prepared according to DIN EN ISO 28199-1, section 8.2 (version A). This is followed, as in DIN EN ISO 28199-1, section 8.3, by the electrostatic application of an inventive or comparative coating composition in a single application as a wedge with a target film thickness (film thickness of the dry material) in the range from 0 µm to 30 µm. The resulting waterborne basecoat film is dried after a flashing time of 10 minutes at 18-23° C. (running test) or without a prior flashing time, in a forced air oven at 80° C. for 5 minutes. In the case of the test for runs, the panels are flashed and dried in standing position.

The popping limit, this being the basecoat film thickness at and above which pops occur, is determined according to DIN EN ISO 28199-3, section 5.

The determination of the running tendency is carried out according to DIN EN ISO 28199-3, section 4. In addition to the film thickness at which a run exceeds the length of 10 mm from the bottom edge of the perforation, a determination is optionally made of the film thickness at or above which a first tendency to run is observed visually at a perforation.

Assessment of the Incidence of Pinholes

To assess the incidence of pinholes, an inventive coating composition (or a comparative composition) is applied as a waterborne basecoat material by single application to a steel panel coated with a surfacer coating and with dimensions of 32×60 cm. Beforehand, the steel panel is provided at one long edge with two strips of adhesive (Tesaband adhesive tape, 19 mm) to allow the differences in film thickness to be determined after coating. The waterborne basecoat material is applied electrostatically in a dry film thickness of 16-19 μm. The resulting waterborne basecoat film is subsequently flashed off at room temperature (18 to 23° C.) for 5 minutes and then dried in a forced air oven at 80° C. for 10 minutes. Following removal of one of the two adhesive strips, a commercial two-component clearcoat (Evergloss® from BASF Coatings GmbH) is applied in the form of a wedge manually by gravity-fed spray gun to the dried waterborne basecoat film, with a dry film thickness of 0-55 μm. The resulting clearcoat film is flashed off at room temperature (18 to 23° C.) for 10 minutes, followed by curing in a forced air oven at 140° C. for a further 20 minutes. When the second adhesive strip has been removed, the dry film thickness of the waterborne basecoat is checked, and for the clearcoat wedge, the film thickness ranges 20-30 μm, 30-40 μm and, optionally 40-50 μm are marked on the steel panel. The respective film thicknesses are determined according to DIN EN ISO 2808 (date: May 2007), method 12A (e.g., using the MiniTest 3100-4100 measuring device from ElektroPhysik).

The pinholes are evaluated visually in the separate clearcoat dry film thickness ranges (20-30 μm, 30-40 μm, and optionally 40-50 μm). For each range, the number of pinholes is counted. Results are standardized to an area of 200 $cm^2$. Additionally, where appropriate, a record is made of the dry film thickness at and above which the clearcoat film no longer shows any pinholes.

Determination of Angle-Dependent Lightnesses/Flop Index

For determining the lightness or the flop index, an inventive coating composition (or a comparative composition) is applied as waterborne basecoat material to a steel panel coated with a surfacer coating and measuring 32×60 cm, by means of dual application, with application in a first step taking place electrostatically in a dry film thickness of 8-9 μm, and application in a second step, after a 2-minute flashing time at room temperature (18 to 23° C.), taking place pneumatically in a dry film thickness of 4-5 μm. Subsequently, after a further flashing time at room temperature of 5 minutes, the resulting waterborne basecoat film is dried in a forced air oven at 80° C. for 5 minutes. Applied to the dried waterborne basecoat film is a commercial two-component clearcoat (ProGloss® from BASF Coatings GmbH) in a dry film thickness of 40-45 μm. The resulting clearcoat film is flashed for a time of 10 minutes at room temperature (18 to 23° C.) This is followed by curing in a forced air oven at 140° C. for a further 20 minutes.

The substrate coated accordingly is subjected to measurement using an X-Rite spectrophotometer (X-Rite MA68 Multi-Angle Spectrophotometer). The surface here is illuminated with a light source. Spectral detection in the visible range is carried out at different angles. The spectral measurements obtained in this way can be used, taking into account the standardized spectral values and also the reflection spectrum of the light source used, to calculate color values in the CIEL*a*b* color space, where L* characterizes the lightness, a* the red-green value, and b* the yellow-blue value. This method is described in, for example, ASTM E2194-12, especially for coatings whose pigment comprises at least one effect pigment. The derived value, often employed for quantifying the so-called metallic effect, is the flop index, which describes the relationship between the lightness and the angle of observation (cf. A. B. J. Rodriguez, JOCCA, 1992(4), pp. 150-153). From the lightness values determined for the viewing angles of 15°, 45° and 110°, it is possible to calculate the flop index (FL) according to the formula $$FL=2.69(L^*15°-L^*110°)1.11/(L^*45°)0.86$$

where L* stands for the lightness value measured at the respective angle (15°, 45° and 110°).

Condensation Test

To assess the condensation sensitivity, multicoat paint systems are produced in the following general protocol:

The waterborne basecoat material is applied electrostatically in a target film thickness (film thickness of the dry material) of 18 μm to a steel panel coated with a standard cathodic electrocoat (CathoGuard® 800 from BASF Coatings). After a flashing time of 4 minutes at room temperature, the system is dried in a forced air oven at 80° C. for 10 minutes.

Applied manually to the dried waterborne basecoat film using a gravity-fed spray gun, is a commercial two-component clearcoat (ProGloss® from BASF Coatings GmbH) in a target film thickness (film thickness of the dried material) of 40-45 μm. The resulting clearcoat film is flashed off at room temperature (18 to 23° C.) for 10 minutes, followed by curing in a forced air oven at 140° C. for a further 20 minutes.

The samples with the respective multicoat systems are subsequently stored over a period of 10 days in a conditioning chamber under CH test conditions according to DIN EN ISO 6270-2:2005-09. The panels, 24 hours after removal from the conditioning chamber, were then inspected for blistering and swelling. Where there is no swelling, the result is rated OK (satisfactory). Where there is only slight swelling, the result is rated as bOK (basically satisfactory); in the event of more severe swelling, the result is rated as nOK (not satisfactory).

The incidence of blisters is assessed as follows by a combination of 2 scores:

- The number of blisters is scored by a quantity figure from 0 to 5, with ml denoting very few and m5 very many blisters.
- The size of the blisters is scored by a size figure likewise from 1 to 5, with g1 denoting very small and g5 very large blisters.

The designation m0g0, accordingly, denotes a blister-free coating after condensation storage, and represents an OK result for blistering.

To assess the technological properties of the multicoat paint systems after condensation exposure, cross-cuts were carried out according to DIN EN ISO 2409 (rating GT0 to GT5; 0=best score; 5=worst score). The multicoat paint systems were assessed for stonechip adhesion as in DIN EN ISO 20567-1, method B. The resultant damage pattern was likewise assessed as in DIN EN ISO 20567-1. Furthermore, steam jet tests were carried out as in DIN 55662, method B. The scratches (diagonal cross) were made using a Sikkens scratch needle (see DIN EN ISO 17872 Annex A). The assessment of the steam jet test results was made according to DIN 55662, and in particular the maximum width of the detachments in millimeters was ascertained.

The leveling or waviness of the coated substrates is assessed using a Wave scan instrument from Byk/Gardner. For this purpose, a laser beam is directed at an angle of 60° onto the surface under investigation, and the fluctuations in the reflected light in the so-called shortwave range (0.3 to 1.2 mm) and in the so-called longwave range (1.2 to 12 mm) are recorded by the instrument over a measuring distance of 10 cm (longwave=LW; shortwave=SW; the lower the values, the better the appearance). Furthermore, as a measure of the sharpness of an image reflected in the surface of the multicoat system, the instrument measures the characteristic variable "distinctness of image" (DOI) (the higher the value, the better the appearance).

Assessment of Refinish Adhesion Properties before and after Condensation

To assess the refinish adhesion properties before and after condensation, multicoat paint systems are produced according to the following general protocols:

Original Finish

A metallic substrate measuring 10×20 cm and coated with a cured electrocoat system (CathoGuard® 500 from BASF Coatings GmbH) is coated with the waterborne basecoat material by dual application; application in the first step takes place electrostatically in a target film thickness of 8-9 μm, and in a second step, after a 2-minute flashing time at room temperature, it takes place pneumatically in a target film thickness of 4-5 μm. After a further flashing time at room temperature of 5 minutes, the resulting waterborne basecoat film is dried in a forced air oven at 80° C. for 5 minutes. Applied to the dried waterborne basecoat film is a commercial two-component clearcoat (ProGloss from BASF Coatings GmbH) in a target film thickness of 40-45 μm. The resulting clearcoat film is flashed off at room temperature for 10 minutes, followed by curing in a forced air oven at 140° C. for a further 20 minutes.

The system obtainable in this way is referred to below as original finish (system a).

Alternatively, the curing of the basecoat and clearcoat films is performed at 60 minutes/140° C. (referred to hereinafter as overbaked original finish; system b) and at 30 minutes/160° C. (referred to hereinbelow as overbaked original finish; system c).

Refinish

The original finish or, alternatively, the overbaked original finishes is or are coated in turn with the waterborne basecoat material by dual application, with application in the first step taking place electrostatically (a target film thickness 8-9 μm) and, after a 2-minute flashing time at room temperature, taking place in the second step pneumatically (a target film thickness of 4-5 μm). After a further 5-minute flashing time at room temperature, the resulting waterborne basecoat film is dried in a forced air oven at 80° C. for 10 minutes. Applied over this dried waterborne basecoat film is a commercial two-component clearcoat (ProGloss from BASF Coatings GmbH) in a target film thickness of 40-45 μm. The resulting clearcoat film is flashed off at room temperature for 10 minutes, then cured in a forced air oven at 140° C. for a further 20 minutes.

The system obtainable in this way is referred to below as refinish; depending on the drying conditions of the original finish, there are three different multicoat systems: system A is a refinish on system a; system B is a refinish on system b, and system C is a refinish on system c.

To assess the technological properties of the multicoat systems, cross-cuts were performed according to DIN EN ISO 2409 (rating GT 0 to GT 5; 0=best score; 5=worst score). The multicoat paint systems are assessed for stonechip adhesion as in DIN EN ISO 20567-1, method B. The resulting damage pattern is likewise assessed as in DIN EN ISO 20567-1.

Additionally, corresponding samples with the respective multicoat systems are stored over a period of 10 days in a conditioning chamber under CH test conditions according to DIN EN ISO 6270-2:2005-09. 24 hours after removal from the conditioning chamber, the panels are assessed for cross-cut adhesion and stonechip adhesion in accordance with the methods already described.

Determination of Particle Size of Polymers in the Aqueous Dispersion

The particle size of the polymers was determined by dynamic light scattering as in DIN ISO 13321 (October 2004).

Determination of Glass Transition Temperature Tg of the Polymers

The glass transition temperature Tg of the polymers was determined by DSC (Differential Scanning Calorimetry) as in DIN 53765 (March 1994).

Determination of Free Isocyanate Content

Determining the amount of free isocyanate groups, also referred to below as NCO content, was done by adding an excess of 2% N,N-dibutylamine solution in xylene to a homogeneous solution of the samples in acetone/N-ethylpyrrolidone (1:1 vol %), by potentiometric back-titration of the excess amine with a 0.1N hydrochloric acid in a method based on DIN EN ISO 3251, DIN EN ISO 11909 and DIN EN ISO 14896. Via the fraction of a polymer (solids content) in solution, it is possible to calculate back to the NCO content of the polymer, based on solids content.

Working Examples

The inventive and comparative examples below serve to illustrate the invention, but should not be given a limiting interpretation.

Unless stated otherwise, the figures in parts are parts by weight, and figures in percent are in each case percentages by weight.

1. Components Used

The definition of the components identified below and used in producing the inventive dispersions and also the inventive waterborne basecoat materials comprising the dispersions of the invention as binders, and the corresponding comparative examples, is as follows:

DI water deionized water
Rhodapex CO 436 commercially available emulsifier from Solvay
APS ammonium peroxodisulfate
1,6-HDDA 1,6-hexanediol diacrylate
2-HEA 2-hydroxyethyl acrylate
MMA methyl methacrylate
DMEA dimethylethanolamine
EF 800 Aerosol® EF-800, commercially available emulsifier from Cytec
Dimer fatty acid polymeric fatty acid (dimer content at least 98 wt %, trimer content at most 2 wt %, monomer content no more than traces), e.g., Pripol® 1012 from Croda
PTHF PolyTHF® 1000, available from BASF SE
MEK methyl ethyl ketone
DMPA dimethylolpropionic acid
NCO isocyanate
TMXDI m-tetramethylxylylidene diisocyanate
IPDI isophorone diisocyanate HBA 4-hydroxybutyl acrylate HEMA 2-hydroxyethyl methacrylate TMP-Al trimethylolpropane monoallyl ether, available commercially from Perstorp 2. Examples of Syntheses of Aqueous Dispersions Comprising at Least One Multistage Polymer 2.1 Preparation of an Aqueous Dispersion BM1 containing a Three-Stage Seed-Core-Shell Polymer SCS1 (as per Korea Polym. J., vol. 7, No. 4, pp. 213-222; Not Inventive)

Components 1 to 4 from table 1.1 are placed into a steel reactor (5 L volume) with reflux condenser and heated to 80° C. The initiator solution (table 1.1, items 5 and 6) is added dropwise to the reactor over the course of 5 minutes. 30 minutes of stirring follows.

The components identified under "Mono 1" in table 1.1 are premixed in a separate vessel. This mixture is added dropwise to the reactor over the course of 2 hours. 1 hour of stirring follows.

The components identified under "Mono 2" in table 1.1 are premixed in a separate vessel. This mixture is added dropwise to the reactor over the course of 1 hour. 1 hour of stirring follows.

Thereafter the reaction mixture is cooled to 60° C. and the neutralizing mixture (table 1.1, items 20 to 22) is premixed in a separate vessel. The neutralizing mixture is added dropwise to the reactor over the course of 40 minutes. The reaction product is then stirred for 30 minutes more, cooled to 25° C., and filtered.

TABLE 1.1 aqueous dispersion BM1 comprising the multistage polymer SCS1 (not inventive)

| | | BM1 |
|---|---|---|
| | Initial charge | |
| 1 | DI water | 43.54 |
| 2 | Rhodapex CO 436 | 0.16 |
| 3 | Styrene | 0.5 |
| 4 | Ethyl acrylate | 0.55 |
| | Initiator solution | |
| 5 | DI water | 0.55 |
| 6 | APS | 0.02 |
| | Mono 1 | |
| 7 | DI water | 13.31 |
| 8 | Rhodapex CO 436 | 0.13 |
| 9 | APS | 0.02 |
| 10 | Styrene | 5.84 |
| 11 | Ethyl acrylate | 11.05 |
| 12 | 1,6-HDDA | 0.35 |
| | Mono 2 | |
| 13 | DI water | 5.97 |
| 14 | Rhodapex CO 436 | 0.06 |
| 15 | APS | 0.02 |
| 16 | Methacrylic acid | 0.74 |
| 17 | 2-HEA | 0.99 |
| 18 | Ethyl acrylate | 3.04 |
| 19 | MMA | 0.6 |
| | Neutralizing | |
| 20 | DI water | 6.75 |
| 21 | Butyl glycol | 4.96 |
| 22 | DMEA | 0.79 |
| | pH | 8.1 |

The solids content is 23.4%.

Preparation of an Aqueous Dispersion BM2 Comprising Three-Stage Seed-Core-Shell Polymer SCS2 (not Inventive)

Monomer Mixture (A), Stage i.

80 wt % of items 1 and 2 from table 1.2 are placed into a steel reactor (5 L volume) with reflux condenser and heated to 80° C. The remainder of the components listed under "Initial charge" in table 1.2 are premixed in a separate vessel. This mixture and, separately from it, the initiator solution (table 1.2, items 5 and 6) are added dropwise simultaneously to the reactor over the course of 20 minutes; in the reaction solution, the fraction of monomers, based on the total amount of monomers used in stage i., does not exceed 6.0 wt % throughout the reaction period. 30 minutes of stirring follow.

Monomer Mixture (B), Stage ii.

The components specified under "Mono 1" in table 1.2 are premixed in a separate vessel. This mixture is added dropwise to the reactor over the course of 2 hours; in the reaction solution, the fraction of monomers, based on the total amount of monomers used in stage ii., does not exceed 6.0 wt % throughout the reaction period. 1 hour of stirring follows.

Monomer Mixture (C), Stage iii.

The components specified under "Mono 2" in table 1.2 are premixed in a separate vessel. This mixture is added dropwise to the reactor over the course of 1 hour; in the reaction solution, the fraction of monomers, based on the total amount of monomers used in stage iii., does not exceed 6.0 wt % throughout the reaction period. 2 hours of stirring follow.

Thereafter the reaction mixture is cooled to 60° C. and the neutralizing mixture (table 1.2, items 20, 21 and 22) is premixed in a separate vessel. The neutralizing mixture is added dropwise to the reactor over the course of 40 minutes, with the pH of the reaction solution being adjusted to a value of 7.5 to 8.5. Subsequently the reaction product is stirred for 30 minutes more, cooled to 25° C., and filtered.

TABLE 1.2 aqueous dispersion BM2 comprising the multistage polymer SCS2 (not inventive)

| | | BM2 |
|---|---|---|
| | Initial charge | |
| 1 | DI water | 41.81 |
| 2 | EF 800 | 0.18 |
| 3 | Styrene | 0.68 |
| 4 | n-Butyl acrylate | 0.48 |

TABLE 1.2-continued aqueous dispersion BM2 comprising the multistage polymer SCS2 (not inventive)

| | | BM2 |
|---|---|---|
| | Initiator solution | |
| 5 | DI water | 0.53 |
| 6 | APS | 0.02 |
| | Mono 1 | |
| 7 | DI water | 12.78 |
| 8 | EF 800 | 0.15 |
| 9 | APS | 0.02 |
| 10 | Styrene | 5.61 |
| 11 | n-Butyl acrylate | 13.6 |
| 12 | 1,6-HDDA | 0.34 |
| | Mono 2 | |
| 13 | DI water | 5.73 |
| 14 | EF 800 | 0.07 |
| 15 | APS | 0.02 |
| 16 | Methacrylic acid | 0.71 |
| 17 | 2-HEA | 0.95 |
| 18 | n-Butyl acrylate | 3.74 |
| 19 | MMA | 0.58 |
| | Neutralizing | |
| 20 | DI water | 6.48 |
| 21 | Butyl glycol | 4.76 |
| 22 | DMEA | 0.76 |

The solids content was determined for reaction monitoring. It was 25.5 wt %.

2. Synthesis of Polyurethanes (P1), (P2), (P3), (P4) and (P5)

a) Preparation of Polyester Diols ED1 to ED4

The polyester diols are synthesized by charging a reaction vessel with stirrer, reflux condenser and water separator with at least one polycarboxylic acid and optionally at least one organic solvent. The initial charge is mixed with at least one polyol and heated with stirring at a temperature in the range from 160 to 240° C. until the desired amount of water and any organic solvent present, indicating complete or the desired conversion, has been removed. The individual components for the synthesis of the various polyester diols ED1 to ED4 are shown in table 2.1 below.

TABLE 2.1 composition/characteristics of polyester diols ED1 to ED4

| | ED1 | ED2 | ED3 | ED4 |
|---|---|---|---|---|
| Adipic acid | 34.30 | 32.90 | | |
| Isophthalic acid | 17.05 | 16.38 | | 12.04 |
| 1,6-Hexanediol | 44.84 | 38.27 | | 22.16 |
| Dimer fatty acid | | | 17.83 | 40.66 |
| PTHF | | | 61.56 | |
| Neopentyl glycol | | 4.19 | | |
| Cyclohexane as entrainer | 2.40 | 2.40 | 0.80 | 0.36 |
| MEK | 12.60 | 12.60 | | 24.79 |
| Solids content [%] | 84 | 84 | 97 | 73 |
| OH number [mg KOH/g] | 52 | 52 | 50 | 75 |
| Acid number [mg KOH/g] | 2.6 | 1.6 | 2.5 | 3.5 |
| $M_n$ [g/mol] | 3230 | 2980 | 3450 | 1450 |

b) Preparation of Polyurethanes (P1) to (P5)

The polyurethanes (P) are synthesized by charging a reaction vessel with stirrer and reflux condenser with a polyester diol, DMPA, and a diisocyanate together with an inert solvent such as MEK. The mixture is subsequently heated at 80° C. This temperature is maintained until the measured free isocyanate group content is constant. This means that the difference in the NCO content between two successive measurements is less than or equal to 0.04%.

A chain extension is then carried out at 80° C. with an olefinically unsaturated hydroxyl compound (in 20% excess). The addition is made over the course of 30 minutes. Stirring then continues at constant temperature until the free isocyanate group content is less than 0.01 wt %. Any residual isocyanate groups still present are reacted with butanol.

Then DMEA is added at a uniform rate over the course of 30 minutes at 80° C., followed by an 1 hour of homogenization, to give a degree of neutralization of 80%. The mixture is thereafter adjusted with deionized water to the appropriate solids content as per table 2.3, the water being added at a uniform rate over the course of 90 minutes. After homogenization for an hour again, the organic solvent is removed by distillation under reduced pressure at 80° C. The individual components for the synthesis of the various polyurethanes (P1) to (P5) are shown in table 2.2 below.

TABLE 2.2 synthesis of polyurethanes (P1) (not inventive) and (P2), (P3), (P4) and (P5) (inventive)

| | Polyurethane | | | | |
|---|---|---|---|---|---|
| | (P1) | (P2) | (P3) | (P4) | (P5) |
| Polyester diol | | | | | |
| ED4 | 55.00 | 31.00 | | | |
| ED1 | | | 20.00 | | |
| ED2 | | | | 21.00 | |
| ED3 | | | | | 20.38 |
| DMPA | 53.00 | 35.00 | 24.00 | 23.00 | 23.49 |
| NCO component | | | | | |
| TMXDI | | 88.00 | | | |
| IPDI | 133.40 | | 59.00 | 58.80 | 58.82 |
| Chain extension | | | | | |
| HEMA | 25.00 | | | | |
| HBA | | 43.00 | 27.00 | 27.00 | |
| TMP-Al | 17.70 | | | | |
| Neutralizing | | | | | |
| DMEA | Setting of a degree of neutralization of 80% | | | | |

TABLE 2.3 characteristics of the polyurethanes (P1) (not inventive) and (P2), (P3), (P4) and (P5) (inventive)

| | Polyurethane | | | | |
|---|---|---|---|---|---|
| Characteristics | (P1) | (P2) | (P3) | (P4) | (P5) |
| Solids content [%] | 29.0 | 34.5 | 30.1 | 29.9 | 27.6 |
| Acid number [mgKOH/g] | 30.4 | 37.5 | 18.9 | 17.7 | 22.0 |
| $M_n$ | 6107 | 3910 | 8411 | 4185 | 7310 |
| $M_w$ | 78 000 | 14 150 | 26 020 | 13 250 | 40 090 |
| Polydispersity d | 12.8 | 3.6 | 3.1 | 3.2 | 5.5 |
| Particle size $D_h$ [nm] | 119 | 83 | 103 | 101 | 42 |
| Tg [° C.] | −30 | −30 | −34 | −31 | n.d. |
| Surface tension [mN/m] | 38.4 | 43.2 | 46.8 | 49.5 | 40.9 |

n.d. = not determined

3. Synthesis of Aqueous Dispersion BM3 and BM4 (Not Inventive) and BM5 to BM9 (Inventive) comprising a Polymer containing Polyurethanes SCS3 and SCS4 and, respectively, SCS5 to SCS9

Monomer Mixture (A), Stage i.

80 wt % of items 1 and 2 (2a and 2b) from table 3.1 are placed into a steel reactor (5 L volume) with reflux condenser and heated to 80° C. The remainder of the components listed under "Initial charge" in table 3.1 are premixed in a separate vessel. This mixture and, separately from it, the initiator solution (table 3.1, items 6 and 7) are added dropwise simultaneously to the reactor over the course of 20 minutes; in the reaction solution, the fraction of monomers, based on the total amount of monomers used in stage i., does not exceed 6.0 wt % throughout the reaction period. 30 minutes of stirring follow.

Monomer Mixture (B), Stage ii.

The components specified under "Mono 1" in table 3.1 are premixed in a separate vessel. This mixture is added dropwise to the reactor over the course of 2 hours; in the reaction solution, the fraction of monomers, based on the total amount of monomers used in stage ii., does not exceed 6.0 wt % throughout the reaction period. 1 hour of stirring follows.

Monomer Mixture (C), Stage iii.

The components specified under "Mono 2" in table 3.1 are premixed in a separate vessel. This mixture is added dropwise to the reactor over the course of 1 hour; in the reaction solution, the fraction of monomers, based on the total amount of monomers used in stage iii., does not exceed 6.0 wt % throughout the reaction period. 2 hours of stirring follow. Thereafter the reaction mixture is cooled to 60° C. and the neutralizing mixture (table 3.1, items 23, 24 and 25) is premixed in a separate vessel. The neutralizing mixture is added dropwise to the reactor over the course of 40 minutes, with the pH of the reaction solution being adjusted to a value of 7.5 to 9.5. Subsequently the reaction product is stirred for 30 minutes more, cooled to 25° C., and filtered.

TABLE 3.1 composition of aqueous dispersion BM3 and BM4 (not inventive) and BM5 to BM9 (inventive) of the polyurethane (P1) to (P5)-comprising polymers SCS3 and SCS4 and, respectively, SCS5 to SCS9

| | | BM5 | BM8 | BM7 | BM6 | BM9 | BM3 | BM4 |
|---|---|---|---|---|---|---|---|---|
| | Initial charge | | | | | | | |
| 1 | DI water | 41.34 | 41.58 | 41.78 | 41.22 | 42.27 | 43.50 | 43.06 |
| 2 | Emulsifying | | | | | | | |
| 2a | EF800 | 0.18 | 0.09 | 0.18 | 0.18 | 0.18 | 0.19 | 0.19 |
| 2b | (P4) | | 0.23 | | | | | |
| 3 | Styrene | 0.47 | 0.48 | 0.48 | 0.47 | 0.47 | 0.5 | 0.54 |
| 4 | n-Butyl acrylate | 0.67 | 0.68 | 0.68 | 0.67 | 0.67 | | |
| 5 | Ethyl acrylate | | | | | | 0.55 | 0.54 |
| | Initiator solution | | | | | | | |
| 6 | DI water | 0.52 | 0.53 | 0.53 | 0.52 | 0.52 | 0.55 | 0.54 |
| 7 | APS | 0.02 | 0.02 | 0.02 | 0.02 | 0.02 | 0.02 | 0.02 |
| | Mono 1 | | | | | | | |
| 8 | DI water | 12.64 | 12.78 | 12.78 | 12.61 | 12.62 | 13.31 | 13.17 |
| 9 | Emulsifier | | | | | | | |
| 9a | EF800 | 0.15 | 0.08 | 0.15 | 0.15 | 0.15 | 0.15 | 0.15 |
| 9b | (P4) | | 0.14 | | | | | |
| 10 | APS | 0.02 | 0.02 | 0.02 | 0.02 | 0.02 | 0.02 | 0.02 |
| 11 | Styrene | 5.55 | 5.61 | 5.61 | 5.53 | 5.54 | 5.84 | 5.78 |
| 12 | n-Butyl acrylate | 13.46 | 13.6 | 13.6 | 13.42 | 13.43 | | |
| 13 | Ethyl acrylate | | | | | | 11.05 | 10.94 |
| 14 | 1,6-HDDA | 0.34 | 0.34 | 0.34 | 0.34 | 0.34 | 0.35 | 0.35 |
| | Mono 2 | | | | | | | |
| 15 | DI water | 5.67 | 5.73 | 5.73 | 5.65 | 5.66 | 5.97 | 5.91 |
| 16 | Emulsifier | | | | | | | |
| 16a | (P2) | 1.16 | | 0.1 | | | | |
| 16b | (P5) | | | | 1.44 | | | |
| 16c | (P4) | | 0.05 | | | | | |
| 16d | (P3) | | | | | 1.32 | | |
| 16e | (P1) | | | | | | 0.11 | 1.14 |
| 16f | EF800 | | 0.03 | | | | | |
| 17 | APS | 0.02 | 0.02 | 0.02 | 0.02 | 0.02 | 0.02 | 0.02 |
| 18 | Methacrylic acid | 0.70 | 0.71 | 0.71 | 0.70 | 0.70 | 0.74 | 0.74 |
| 19 | 2-HEA | 0.94 | 0.95 | 0.95 | 0.94 | 0.94 | 0.99 | 0.99 |
| 20 | n-Butyl acrylate | 3.70 | 3.70 | 3.74 | 3.69 | 3.69 | | |
| 21 | Ethyl acrylate | | | | | | 3.04 | 3.04 |
| 22 | MMA | 0.58 | 0.57 | 0.58 | 0.57 | 0.57 | 0.6 | 0.6 |

TABLE 3.1-continued composition of aqueous dispersion BM3 and BM4 (not inventive) and BM5 to BM9 (inventive) of the polyurethane (P1) to (P5)-comprising polymers SCS3 and SCS4 and, respectively, SCS5 to SCS9

| | | BM5 | BM8 | BM7 | BM6 | BM9 | BM3 | BM4 |
|---|---|---|---|---|---|---|---|---|
| | Neutralizing | | | | | | | |
| 23 | DI water | 6.41 | 6.48 | 6.48 | 6.39 | 6.40 | 6.75 | 6.75 |
| 24 | Butyl glycol | 4.71 | 4.76 | 4.76 | 4.70 | 4.70 | 4.96 | 4.96 |
| 25 | DMEA | 0.75 | 0.76 | 0.76 | 0.75 | 0.75 | 0.79 | 0.79 |

For the monitoring of the reaction, the solids content of each aqueous dispersion was determined. The results are reported together with the respective pH and the particle sizes found for the multistage polymers, in table 3.2.

TABLE 3.2 characteristics of the aqueous dispersions and their constituent polymers SCS3 and SCS4 (not inventive) and SCS5 to SCS9 (inventive)

| | BM5/SCS5 | BM8/SCS8 | BM7/SCS7 | BM6/SCS6 | BM9/SCS9 | BM3/SCS3 | BM4/SCS4 |
|---|---|---|---|---|---|---|---|
| Solids content [%] | 26.6 | 26.7 | 25.8 | 25.6 | 25.7 | 21.9 | 23 |
| pH | 8.45 | 9.09 | 8.57 | 8.85 | 9.05 | 8.35 | 7.76 |
| Particle size [nm] | 240 | 309 | 236 | 246 | 230.7 | 182 | 201 |

4. Examples for the Production of Waterborne Basecoat Materials 4.1 Production of a Noninventive Waterborne Basecoat Material WBM1 Based on a Noninventive Aqueous Dispersion Comprising a Multistage Polymer as Per Korea Polym. J., Vol. 7, No. 4, Pp. 213-222 and Also of the Noninventive Waterborne Basecoat Materials WBM2 to WBM4 and the Inventive Waterborne Basecoat Materials WBM5 and WBM6

The components listed under “Aqueous phase” in table 4.1 are stirred together in the order stated to form an aqueous mixture. In the next step, an organic mixture is prepared from the components listed under “Organic phase”. The organic mixture is added to the aqueous mixture. The resulting mixture is then stirred for 10 minutes and adjusted using deionized water and dimethylethanolamine to a pH of 8 and to a spray viscosity of 85±5 mPa·s under a shearing load of 1000 $s^{-1}$ as measured using a rotary viscometer (Rheolab QC instrument with C-LTD80/QC heating system from Anton Paar) at 23° C.

TABLE 4.1 production of waterborne basecoat materials WBM1 to WBM4 (not inventive) and WBM5 and WBM6 (inventive)

| | WBM1 | WBM2 | WBM3 | WBM4 | WBM5 | WBM6 |
|---|---|---|---|---|---|---|
| Aqueous phase: | | | | | | |
| 3% Na Mg phyllosilicate solution | 10.00 | 10.00 | 10.00 | 10.00 | 10.00 | 10.00 |
| Aqueous dispersion BM1 (as per Korea Polym. J. vol. 7, No. 4, pp. 213-222) | 28.40 | | | | | |
| Aqueous dispersion BM2 | | 25.95 | | | | |
| Aqueous dispersion BM3 | | | 30.30 | | | |
| Aqueous dispersion BM4 | | | | 28.50 | | |
| Aqueous dispersion BM5 | | | | | 24.95 | |
| Aqueous dispersion BM6 | | | | | | 25.55 |
| Deionized water | 30.30 | 32.75 | 27.90 | 29.70 | 33.25 | 33.15 |
| Polyester; prepared as per example D, column 16, lines 37-59 of DE 40 09 858 A1 | 2.70 | 2.70 | 2.70 | 2.70 | 2.70 | 2.70 |
| n-Butoxypropanol | 3.20 | 3.20 | 3.20 | 3.20 | 3.20 | 3.20 |
| Melamine-formaldehyde resin (Cymel ® 303 from Allnex) | 3.20 | 3.20 | 3.20 | 3.20 | 3.20 | 3.20 |
| 10% dimethyl-ethanolamine in water | 2.30 | 2.30 | 2.30 | 2.30 | 2.30 | 2.30 |

TABLE 4.1-continued production of waterborne basecoat materials WBM1 to WBM4 (not inventive) and WBM5 and WBM6 (inventive)

| | WBM1 | WBM2 | WBM3 | WBM4 | WBM5 | WBM6 |
|---|---|---|---|---|---|---|
| Polyurethane-modified polyacrylate, prepared as per page 7, line 55 to page 8, line 23 of DE 4437535 A1 | 3.60 | 3.60 | 3.60 | 3.60 | 3.60 | 3.60 |
| Rheovis ® AS 1130, available from BASF SE | 1.50 | 1.50 | 2.00 | 2.00 | 2.00 | 1.50 |
| Organic phase: | | | | | | |
| Butyl glycol | 7.00 | 7.00 | 7.00 | 7.00 | 7.00 | 7.00 |
| Pluriol ® E300 from BASF SE | 2.80 | 2.80 | 2.80 | 2.80 | 2.80 | 2.80 |
| Aluminum pigment, available from Altana-Eckart (Alu Stapa Hydrolux 8154) | 5.00 | 5.00 | 5.00 | 5.00 | 5.00 | 5.00 |
| Total: | 100.00 | 100.00 | 100.00 | 100.00 | 100.00 | 100.00 |

4.2 Production of a Noninventive Waterborne Basecoat Material WBM7 Based on a Noninventive Aqueous Dispersion BM1 Comprising a Multistage Polymer as Per Korea Polym. J., Vol. 7, No. 4, Pp. 213-222 and Also of the Noninventive Waterborne Basecoat Materials WBM8, WBM9 and WBM12 and the Inventive Waterborne Basecoat Materials WBM10, WBM11 and WBM13

The components listed under "Aqueous phase" in table 4.2 are stirred together in the order stated to form an aqueous mixture. In the next step, an organic mixture is prepared from the components listed under "Organic phase". The organic mixture is added to the aqueous mixture. The resulting mixture is then stirred for 10 minutes and adjusted using deionized water and dimethylethanolamine to a pH of 8 and to a spray viscosity of 95±5 mPa·s (WBM7) or 120±5 mPa·s (WBM8-WBM11) under a shearing load of 1000 $s^{-1}$ as measured using a rotary viscometer (Rheolab QC instrument with C-LTD80/QC heating system from Anton Paar) at 23° C.

TABLE 4.2 production of waterborne basecoat materials WBM7 to WBM9 (not inventive) and WBM10 and WBM11 D (inventive)

| | WBM7 | WBM8 | WBM9 | WBM10 | WBM11 |
|---|---|---|---|---|---|
| Aqueous phase: | | | | | |
| Aqueous dispersion BM1 (as per Korea Polym. J. vol. 7, No. 4, pp. 213-222) | 28.40 | | | | |
| Aqueous dispersion BM3 | | 30.30 | | | |
| Aqueous dispersion BM4 | | | 28.50 | | |
| Aqueous dispersion BM5 | | | | 24.95 | |
| Aqueous dispersion BM7 | | | | | 25.75 |
| Deionized water | 34.80 | 31.90 | 33.70 | 37.25 | 36.45 |
| Polyester; prepared as per example D, column 16, lines 37-59 of DE 40 09 858 A1 | 2.70 | 2.70 | 2.70 | 2.70 | 2.70 |
| n-Butoxypropanol | 3.20 | 3.20 | 3.20 | 3.20 | 3.20 |
| Melamine-formaldehyde resin (Cymel ® 303 from Allnex) | 3.20 | 3.20 | 3.20 | 3.20 | 3.20 |
| 10% dimethyl-ethanolamine in water | 2.30 | 3.30 | 3.30 | 3.30 | 3.30 |

TABLE 4.2-continued production of waterborne basecoat materials WBM7 to WBM9 (not inventive) and WBM10 and WBM11 D (inventive)

| | WBM7 | WBM8 | WBM9 | WBM10 | WBM11 |
|---|---|---|---|---|---|
| Polyurethane-modified polyacrylate, prepared as per page 7, line 55 to page 8, line 23 of DE 4437535 A1 | 3.60 | 3.60 | 3.60 | 3.60 | 3.60 |
| Rheovis ® AS 1130, available from BASF SE | 1.00 | 1.00 | 1.00 | 1.00 | 1.00 |
| Aquatix ® 8421, available from BYK-Chemie GmbH | 2.00 | 2.00 | 2.00 | 2.00 | 2.00 |
| Aquacer ® 526, available from BYK-Chemie GmbH | 3.00 | 3.00 | 3.00 | 3.00 | 3.00 |
| 50 wt % strength solution of Rheovis ® PU1250 in butyl glycol (Rheovis ® PU1250 available from BASF SE) | 1.00 | 1.00 | 1.00 | 1.00 | 1.00 |
| Organic phase: | | | | | |
| Butyl glycol | 7.00 | 7.00 | 7.00 | 7.00 | 7.00 |
| Pluriol ® E300 from BASF | 2.80 | 2.80 | 2.80 | 2.80 | 2.80 |
| SE Aluminum pigment, available from Altana-Eckart (Alu Stapa Hydrolux 8154) | 5.00 | 5.00 | 5.00 | 5.00 | 5.00 |
| Total: | 100.00 | 100.00 | 100.00 | 100.00 | 100.00 |

4.3 Production of a Noninventive Waterborne Basecoat Material WBM12 and the Inventive Waterborne Basecoat Materials WBM13 and WBM14

The components listed under "Aqueous phase" in table 4.3 are stirred together in the order stated to form an aqueous mixture. In the next step, an organic mixture is prepared from the components listed under "Organic phase". The organic mixture is added to the aqueous mixture. The resulting mixture is then stirred for 10 minutes and adjusted using deionized water and dimethylethanolamine to a pH of 8 and to a spray viscosity of 75±5 mPa·s under a shearing load of 1000 $s^{-1}$ as measured using a rotary viscometer (Rheolab QC instrument with C-LTD80/QC heating system from Anton Paar) at 23° C.

TABLE 4.3

| production of waterborne basecoat materials WBM12 (not inventive) and WBM13 and WBM14 (inventive) | | | |
|---|---|---|---|
| | WBM12 | WBM13 | WBM14 |
| Aqueous phase: | | | |
| 3% Na Mg phyllosilicate solution | 10.00 | 10.00 | 10.00 |
| Aqueous dispersion BM2 | 31.00 | | |
| Aqueous dispersion BM8 | | 29.60 | |
| Aqueous dispersion BM9 | | | 30.75 |
| Deionized water | 33.80 | 35.20 | 34.05 |
| Polyester; prepared as per example D, column 16, lines 37-59 of DE 40 09 858 A1 | 2.70 | 2.70 | 2.70 |
| n-Butoxypropanol | 3.20 | 3.20 | 3.20 |
| Melamine-formaldehyde resin (Cymel ® 303 from Allnex) | 3.20 | 3.20 | 3.20 |
| 10% Dimethylethanolamine in water | 0.30 | 0.30 | 0.30 |
| Rheovis ® AS 1130, available from BASF SE | 1.00 | 1.00 | 1.00 |
| Organic phase: | | | |
| Butyl glycol | 7.00 | 7.00 | 7.00 |
| Pluriol ® E300 from BASF SE | 2.80 | 2.80 | 2.80 |
| Aluminum pigment, available from Altana-Eckart (Alu Stapa Hydrolux 8154) | 5.00 | 5.00 | 5.00 |
| Total: | 100.00 | 100.00 | 100.00 |

4.4 Production of a Noninventive Waterborne Basecoat Material WBM15 and of an Inventive Waterborne Basecoat Material WBM16

The components listed under “Aqueous phase” in table 4.4 are stirred together in the order stated to form an aqueous mixture. In the next step, an organic mixture is prepared from the components listed under “Organic phase”. The organic mixture is added to the aqueous mixture. The resulting mixture is then stirred for 10 minutes and adjusted using deionized water and dimethylethanolamine to a pH of 8 and to a spray viscosity of 80±5 mPa·s under a shearing load of 1000 $s^{-1}$ as measured using a rotary viscometer (Rheolab QC instrument with C-LTD80/QC heating system from Anton Paar) at 23° C.

TABLE 4.4

| production of waterborne basecoat materials WBM15 (not inventive) and WBM16 (inventive) | | |
|---|---|---|
| | WBM15 | WBM16 |
| Aqueous phase: | | |
| 3% Na Mg phyllosilicate solution | 19.10 | 19.10 |
| Deionized water | 23.15 | 23.15 |
| n-Butoxypropanol | 1.52 | 1.52 |
| 1-Propxoy-2-propanol | 2.03 | 2.03 |
| Isobutanol | 2.58 | 2.58 |
| 2-Ethylhexanol | 2.31 | 2.31 |
| Aqueous dispersion BM2 | 23.99 | |
| Aqueous dispersion BM6 | | 23.99 |
| Polyester; prepared as per example D, column 16, lines 37-59 of DE 40 09 858 A1 | 2.40 | 2.40 |
| Rheovisl ® AS 1130, available from BASF SE | 0.60 | 0.60 |
| Melamine-formaldehyde resin (Resimene ® 755 from Ineos) | 3.14 | 3.14 |

TABLE 4.4-continued

| production of waterborne basecoat materials WBM15 (not inventive) and WBM16 (inventive) | | |
|---|---|---|
| | WBM15 | WBM16 |
| 10% Dimethylethanolamine in water | 0.65 | 0.65 |
| Pluriol ® P900, available from BASF SE | 0.92 | 0.92 |
| Polyurethane-modified polyacrylate; prepared as per page 7, line 55 to page 8, line 23 of DE 4437535 A1 | 3.51 | 3.51 |
| 50 wt % strength solution of Rheovis ® PU1250 in butyl glycol (Rheovis ® PU1250 available from BASF SE) | 0.46 | 0.46 |
| Tinuvinl ® 384-2, available from BASF SE | 0.74 | 0.74 |
| Tinuvin ® 123, available from BASF SE | 0.37 | 0.37 |
| Byketol ®-WS from Altana/ BYK Chemie GmbH | 0.92 | 0.92 |
| Organic phase: | | |
| Mixture of two commercial aluminum pigments, available from Altana-Eckart (Alu Stapa Hydrolux 2192 & 2197 in ratio 2.5:1.0) | 4.52 | 4.52 |
| Butyl glycol | 5.17 | 5.17 |
| Polyester; prepared as per example D, column 16, lines 37-59 of DE 40 09 858 A1 | 1.75 | 1.75 |
| 10% Dimethylethanolamine in water | 0.18 | 0.18 |
| Total: | 100.00 | 100.00 |

Table 4.5 summarizes the composition of waterborne basecoat materials WBM1 to WBM16 in terms of the multistage-prepared polymers used.

TABLE 4.5

| compositions of waterborne basecoat materials WBM1 to WBM16 | | | |
|---|---|---|---|
| Waterborne basecoat material | Polymer | Inventive | Not inventive |
| WBM1 | SCS1 (as per Korea Polym. J. vol. 7, No. 4, pp. 213-222) | | X |
| WBM2 | SCS2 | | X |
| WBM3 | SCS3 | | X |
| WBM4 | SCS4 | | X |
| WBM5 | SCS5 | X | |
| WBM6 | SCS6 | X | |
| WBM7 | SCS1 (as per Korea Polym. J. vol. 7, No. 4, pp. 213-222) | | X |
| WBM8 | SCS3 | | X |
| WBM9 | SCS4 | | X |
| WBM10 | SCS5 | X | |
| WBM11 | SCS7 | X | |
| WBM12 | SCS2 | | X |
| WBM13 | SCS8 | X | |
| WBM14 | SCS9 | X | |
| WBM15 | SCS2 | | X |
| WBM16 | SCS6 | X | |

5.1 Comparison Between Waterborne Basecoat Materials WBM1 to WBM6 on Properties after Condensation Exposure and on Refinish Adhesion Before and after Condensation An assessment of condensation sensitivity for waterborne basecoat materials WBM1 to WBM4 (containing noninventive multistage polymers) and WBM5 and WBM6 (each containing an inventive multistage polymer) and of refinish adhesion before and after condensation exposure for materials WBM1 and WBM6 was made in accordance with methods described above. The results are summarized in tables 5.1 and 5.2.

TABLE 5.1 effect of condensation on leveling, adhesion, swelling, and blistering of the multicoat systems

| After condensation exposure | Waterborne basecoat material | | | | | |
|---|---|---|---|---|---|---|
| | WBM1 | WBM2 | WBM3 | WBM4 | WBM5 | WBM6 |
| LW: | 2.3 | 5.8 | 9.3 | 8.0 | 4.7 | 2.5 |
| SW: | 18.5 | 27.0 | 29.5 | 30.4 | 19 | 9.9 |
| DOI: | 82.2 | 82.3 | 80.4 | 77.5 | 85.2 | 88.2 |
| Swelling: | bOK | OK | bOK | nOK | OK | OK |
| Blistering: | m1/g1 | m0/g0 | m0/g0 | m0/g0 | m0/g0 | m0/g0 |
| Adhesion (cross-cut): | GT0 | GT0 | GT3-4 | GT0 | GT0 | GT0 |

The results show that using the noninventive dispersion BM1 (WBM1), prepared according to Korea Polym. J. vol. 7, No. 4, pp. 213-222, leads to slight blistering in the condensation test. When the noninventive aqueous dispersion BM2 (WBM2) is used, this problem is not observed, but a high shortwave value is found, as an indicator of inadequate leveling. The multicoat systems WBM3 and WBM4, containing the noninventive aqueous dispersions BM3 and BM4, prepared using the multistage polymers SCS3 and SCS4 with use of a polyurethane, exhibit moderate to severe swelling and additionally, in the case of aqueous dispersion BM3, adhesion problems. On use of the inventive aqueous dispersions BM5 and BM6, comprising multistage-prepared polymers prepared using a polyurethane having a corresponding surface tension and a corresponding polydispersity, very good leveling values are observed, and there are no problems observed in terms of adhesion, swelling or blistering.

TABLE 5.2 refinish adhesion before and after condensation exposure

| Baking conditions of clearcoat in original system | WBM1 | WBM6 |
|---|---|---|
| Refinish adhesion before condensation exposure | | |
| A: standard (140° C./20 minutes) | GT1 | GT0 |
| B: overbaked (140° C./60 minutes) | GT2 | GT1 |
| Refinish adhesion after condensation exposure | | |
| A: standard (140° C./20 minutes) | GT4 | GT0 |
| B: overbaked (140° C./60 minutes) | GT1 | GT1 |

It emerged that relative to the noninventive coating composition WBM1, containing the noninventive aqueous dispersion BM1, the inventive coating composition WMB6, containing the inventive dispersion BM6, enjoys advantages in refinish adhesion, particularly after condensation exposure, with standard baking conditions for the clearcoat (see table 5.2).

5.2 Comparison between Waterborne Basecoat Materials WBM7 to WBM11 on Properties after Condensation Exposure and on Pinhole Sensitivity The waterborne basecoat materials WBM7 to WBM9 (not inventive) and also WBM10 and WBM11 were investigated for condensation resistance, and materials WBM8 and WBM10 were also investigated for their pinhole sensitivity, in accordance with methods described above. The results are summarized in table 5.3 and 5.4.

TABLE 5.3 effect of condensation on leveling, adhesion, swelling, and blistering of the multicoat systems (WBM7 toWBM11)

| After condensation | Aqueous basecoat material | | | | |
|---|---|---|---|---|---|
| exposure | WBM7 | WBM8 | WBM9 | WBM10 | WBM11 |
| LW: | 2 | 18.7 | 15.9 | 4.2 | 3.3 |
| SW: | 17.6 | 31.1 | 39.6 | 23.6 | 19.3 |
| DOI: | 87.1 | 81.6 | 74.6 | 86 | 86.7 |
| Swelling: | OK | nOK | nOK | OK | OK |
| Blistering: | m1/g2 | m3/g1 | m4/g2 | m0/g0 | m0/g0 |
| Adhesion (cross-cut): | GT0 | GT1-2 | GT0 | GT0 | GT0 |

The results demonstrate that using the noninventive aqueous dispersions BM1, BM3, and BM4 leads to blistering and in some cases also to unacceptable swelling and/or adhesion problems. When the inventive aqueous dispersions BM5 and BM7 are used, however, no adverse effect as a result of condensation exposure can be found.

TABLE 5.4 results of the pinholing investigations
Number of pinholes (standardized for 200 $cm^2$):

| Film thickness range | Waterborne basecoat material | |
|---|---|---|
| Clearcoat wedge | WBM8 | WBM10 |
| 20-30 μm | >150 | 0 |
| 30-40 μm | >150 | 0 |
| Total | >300 | 0 |

The inventive coating composition WBM10, containing the inventive aqueous dispersion BM5, has significantly better pinhole robustness by comparison with waterborne basecoat material WBM8 based on the noninventive aqueous dispersion BM3.

5.3 Comparison between Noninventive Waterborne Basecoat Material WBM12 and Inventive Waterborne Basecoat Materials WBM13 and WBM14 on Storage Stability, Pops, Runs, Hue (Flop Index) and Properties after Condensation Exposure The investigations on waterborne basecoat materials WBM12 (not inventive, containing the noninventive aqueous dispersion BM2, and also WBM13 and WBM14 (inventive, containing the inventive aqueous dispersion BM8 and BM9, respectively, each based on a polyurethane (P)) took place in accordance with methods described above. Tables 5.5 and 5.8 summarize the results.

TABLE 5.5

| results of the investigations on storage stability | | | | |
|---|---|---|---|---|
| | | Waterborne basecoat materials | | |
| | | WBM12 | WBM13 | WBM14 |
| Low-shear viscosity (1 $s^{-1}$) in mPa · s | Fresh | 1266 | 1288 | 1644 |
| | After 2 weeks' storage at 40° C. | 2221 | 1196 | 1277 |
| | Change [%] | 75% | −7% | −22% |
| High-shear viscosity (1000 $s^{-1}$) in mPa · s | Fresh | 66 | 66 | 69 |
| | After 2 weeks' storage at 40° C. | 83 | 72 | 69 |
| | Change [%] | 26% | 9% | 0% |

WBM13 and WBM14, based on the inventive multistage polymers based on an olefinically unsaturated polyurethane, have a higher storage stability than WBM12, which contains a noninventive multistage polymer (produced without olefinically unsaturated polyurethane).

TABLE 5.6

| results of the investigations on pops and runs | | | |
|---|---|---|---|
| Running/ | Waterborne basecoat material | | |
| popping limit | WBM12 | WBM13 | WBM14 |
| Running limit | >26 μm | >28 μm | >29 μm |
| Popping limit | >29 μm | >28 μm | >29 μm |

All multicoat systems investigated were free from pops and runs; even at maximum thickness of the wedge construction, there are still no tendencies observed for formation of runs or pops.

TABLE 5.7

| results of the investigations on hue (angle-dependent lightness or flop index) | | | |
|---|---|---|---|
| | Waterborne basecoat material | | |
| | WBM12 | WBM13 | WBM14 |
| $L^*_{15°}$ | 132.2 | 131.0 | 132.3 |
| $L^*_{25°}$ | 105.8 | 106.1 | 105.9 |
| $L^*_{45°}$ | 63.7 | 64.9 | 63.6 |
| $L^*_{75°}$ | 39.4 | 40.0 | 39.9 |
| $L^*_{110°}$ | 32.8 | 33.2 | 33.3 |
| Flop index | 12.5 | 12.0 | 12.4 |

All of the multicoat systems are at comparable levels in terms of hue or angle-dependent lightness; using an olefinically unsaturated polyurethane in the preparation of a multistage polymer therefore does not have any effect on the orientation of the effect pigments and hence on the hue.

TABLE 5.8

| effect of condensation on leveling, adhesion, swelling and blistering of the multicoat systems | | | |
|---|---|---|---|
| After condensation | Aqueous basecoat material | | |
| exposure | WBM12 | WBM13 | WBM14 |
| LW: | 4.5 | 4.6 | 4.5 |
| SW: | 19.5 | 17.6 | 17.6 |
| DOI: | 85.4 | 86.8 | 86.9 |
| Swelling: | OK | OK | OK |
| Blistering: | m0/g0 | m0/g0 | m0/g0 |
| Adhesion (cross-cut): | GT0 | GT0 | GT0 |

By using the inventive aqueous dispersions BM8 (WBM13) and BM9 (WBM14), in comparison to the waterborne basecoat material WBM12 containing the noninventive multistage polymer SCS2 prepared without olefinically unsaturated polyurethane, better leveling after condensation exposure is observed. Blistering, swelling or adhesion problems do not occur with any of the samples investigated.

5.4 Comparison between the Noninventive Waterborne Basecoat Material WBM15 and the Inventive Waterborne Basecoat Material WBM16 on (Refinish) Adhesion before and after Condensation Exposure The adhesion and refinish adhesion properties before and after condensation exposure were investigated for waterborne basecoat materials WBM15 (not inventive, containing the aqueous dispersion BM2, multistage polymer prepared without olefinically unsaturated polyurethane) and WBM16 (inventive, containing the aqueous dispersion BM6, multistage polymer prepared with olefinically unsaturated polyurethane) in accordance with methods described above. Tables 5.9 and 5.10 summarize the results.

TABLE 5.9

| effect of condensation on adhesion | | |
|---|---|---|
| Adhesion after condensation storage | WBM15 | WBM16 |
| Cross-cut | GT0 | GT0 |
| Steam jet | 0 | 0 |
| Stonechip | 1.5 | 1.5 |

With regard to adhesion (cross-cut, steam jet and stonechip) after condensation exposure, no differences are apparent between the two multicoat systems; both WBM15 and WBM16 display very good properties.

TABLE 5.10

| refinish adhesion before and after condensation exposure | | |
|---|---|---|
| Clearcoat baking conditions C: overbaked/underbaked (160° C./30 minutes original finish & 125° C./22 minutes refinish) | WBM15 | WBM16 |
| Refinish adhesion before condensation storage | | |
| Cross-cut | GT0 | GT0 |
| Stonechip | 2 | 1.5 |

TABLE 5.10-continued

| refinish adhesion before and after condensation exposure | | |
|---|---|---|
| Clearcoat baking conditions C: overbaked/underbaked (160° C./30 minutes original finish & 125° C./22 minutes refinish) | WBM15 | WBM16 |
| Refinish adhesion after condensation storage | | |
| Cross-cut | GT0 | GT0 |
| Stonechip | 1.5 | 1.5 |

In the context of refinish adhesion, an advantage in the stonechip before condensation exposure is observed for inventive aqueous dispersion BM6.

What is claimed is:

1. An aqueous dispersion comprising a seed core shell polymer, prepared by successive radical emulsion polymerization of three mutually different monomer mixtures (A), (B), and (C) of olefinically unsaturated monomers, wherein at least one of the monomer mixtures (A), (B) or (C), comprises at least one polyurethane (P) containing at least one olefinically unsaturated group, where, before the polyurethane (P) is admixed to at least one of the monomer mixtures (A), (B), and (C), the monomer mixture (A) comprises at least 50 wt % of monomers having a solubility in water of less than 0.5 g/l at 25° C., and a polymer (a) prepared from the mixture (A) possesses a glass transition temperature of 10 to 65° C., the monomer mixture (B) comprises at least one polyunsaturated monomer, and a polymer (b) prepared from the mixture (B) possesses a glass transition temperature of −35 to 15° C., and a polymer (c) which is prepared from the monomer mixture (C) possesses a glass transition temperature of −50 to 15° C., and where the successive radical emulsion polymerization includes:

i. first the monomer mixture (A) is polymerized, ii. then the monomer mixture (B) is polymerized in the presence of the polymer prepared under i, and iii. thereafter the monomer mixture (C) is polymerized in the presence of the polymer prepared under ii, and the polyurethane (P) has a surface tension in the range from 40 mN/m to 55 mN/m at 23° C., and possesses a polydispersity d of less than 10.

2. The aqueous dispersion as claimed in claim 1, wherein the fraction of the polyurethane (P) is from 0.05 to 1.8 wt %, based on a solids content of the aqueous dispersion.

3. The aqueous dispersion as claimed in claim 1, wherein the fraction of the monomer mixture (A) is from 0.1 to 10 wt %, the fraction of the monomer mixture (B) is from 60 to 80 wt %, and the fraction of the monomer mixture (C) is from 10 to 30 wt %, based in each case on the sum of the individual amounts of mixtures (A), (B), and (C).

4. The aqueous dispersion as claimed in claim 1, wherein the monomer mixture (A) comprises at least one monounsaturated ester of (meth)acrylic acid having an alkyl radical, and at least one vinyl group-containing monoolefinically unsaturated monomer having a radical located on the vinyl group that is aromatic or that is mixed saturated aliphatic-aromatic, in which case the aliphatic fractions of the radical are alkyl groups.

5. The aqueous dispersion as claimed in claim 1, wherein the monomer mixture (B), in addition to the at least one polyolefinically unsaturated monomer, also comprises at least one monounsaturated ester of (meth)acrylic acid having an alkyl radical, and at least one vinyl group-containing monoolefinically unsaturated monomer having a radical located on the vinyl group that is aromatic or that is mixed saturated aliphatic-aromatic, in which case the aliphatic fractions of the radical are alkyl groups.

6. The aqueous dispersion as claimed in claim 1, wherein the monomer mixture (B) comprises, as polyolefinically unsaturated monomers, exclusively diolefinically unsaturated monomers.

7. The aqueous dispersion as claimed in claim 1, wherein the monomer mixtures (A) and (B) contain no hydroxy-functional monomers and no acid-functional monomers.

8. The aqueous dispersion as claimed in claim 1, wherein the monomer mixture (C) comprises at least one alpha-beta-unsaturated carboxylic acid, at least one monounsaturated ester of (meth)acrylic acid having an alkyl radical substituted by a hydroxyl group, and at least one monounsaturated ester of (meth)acrylic acid having an alkyl radical.

9. The aqueous dispersion as claimed in claim 1, wherein a metered addition of the olefinically unsaturated monomers in stages i. to iii. takes place such that a fraction of free monomers in a reaction solution, based on the total amount of monomers used in the respective polymerization, does not exceed 6.0 wt % throughout a reaction period.

10. The aqueous dispersion as claimed in claim 1, wherein the at least one polyurethane containing at least one olefinically unsaturated group is prepared by reaction of at least one polyester diol and at least one polyisocyanate, followed by a chain extension reaction with at least one olefinically unsaturated alcohol.

11. A pigmented aqueous basecoat material which comprises an aqueous dispersion as claimed in claim 1.

12. The pigmented aqueous basecoat material as claimed in claim 11, wherein the weight-percentage fraction of the at least one seed core shell polymer in the aqueous dispersion, based on the total weight of the pigmented aqueous basecoat material, is 1.0 to 24.0 wt %.

13. A method of using an aqueous dispersion as claimed in claim 1, the method including:

producing a pigmented aqueous basecoat material.

14. A method for producing a multicoat paint system by (1) applying a pigmented aqueous basecoat material to a substrate, (2) applying a clearcoat material to the resulting basecoat film, and then (3) curing the basecoat film together with the clearcoat film, wherein the pigmented aqueous basecoat material as claimed in claim 11 is used in stage (1).

15. A multicoat paint system produced by the method as claimed in claim 14.

* * * * *